(12) United States Patent
Jagan

(10) Patent No.: US 11,612,868 B2
(45) Date of Patent: Mar. 28, 2023

(54) IN-LINE FLAVORING GRANULAR AND POWDER CONVEYOR SYSTEM

(71) Applicant: LUXME TECHNOLOGIES INC., Brossard (CA)

(72) Inventor: Navam Jagan, Brossard (CA)

(73) Assignee: LUXME TECHNOLOGIES INC., Brossard (CA)

( * ) Notice: Subject to any disclaimer, the term of this patent is extended or adjusted under 35 U.S.C. 154(b) by 419 days.

(21) Appl. No.: 16/763,596

(22) PCT Filed: Nov. 8, 2018

(86) PCT No.: PCT/CA2018/051415
§ 371 (c)(1),
(2) Date: May 13, 2020

(87) PCT Pub. No.: WO2019/095047
PCT Pub. Date: May 23, 2019

(65) Prior Publication Data
US 2020/0359596 A1 Nov. 19, 2020

Related U.S. Application Data

(60) Provisional application No. 62/619,436, filed on Jan. 19, 2018, provisional application No. 62/585,700, filed on Nov. 14, 2017.

(51) Int. Cl.
*A23G 3/26* (2006.01)
*A23P 20/15* (2016.01)
(Continued)

(52) U.S. Cl.
CPC ............ *B01F 33/8363* (2022.01); *A23G 3/26* (2013.01); *A23P 20/18* (2016.08); *B01F 27/72* (2022.01);
(Continued)

(58) Field of Classification Search
None
See application file for complete search history.

(56) References Cited

U.S. PATENT DOCUMENTS 2,970,563 A * 2/1961 Hunter .................... A23P 20/13
  118/19
3,993,184 A * 11/1976 Campbell .............. B65G 19/16
  198/716

(Continued)

FOREIGN PATENT DOCUMENTS

CA 2156050 A1 9/1994
CA 2266445 A1 2/1999
(Continued)

*Primary Examiner* — Binu Thomas
(74) *Attorney, Agent, or Firm* — Jacob M. Ward; Ward Law Office LLC

(57) ABSTRACT

A granular coating conveyor system for coating granular particles carried in compartments along a tubular conveyor member. Coating fluid is fed over the granular particles through radial nozzles located inside a co-axial rotating blender with tubular member upstream discharge port and tubular member downstream return ingress port for the granular particles. The blender is a drum having a helicoidal spiral screw integrally mounted to an interior peripheral wall face of the drum and extending therealong radially outwardly of the tubular member mixing in the drum in tumbling fashion the granular particles with coating fluid and guiding same therealong, so as to dynamically form a kidney shape mass of granular particles.

20 Claims, 22 Drawing Sheets

(51) Int. Cl.
| | |
|---|---|
| *A23P 20/18* | (2016.01) |
| *B05B 13/02* | (2006.01) |
| *B01F 33/80* | (2022.01) |
| *B07B 1/22* | (2006.01) |
| *B65G 33/14* | (2006.01) |
| *B65G 45/00* | (2006.01) |
| *B01F 27/72* | (2022.01) |
| *B01F 29/64* | (2022.01) |
| *B01F 33/82* | (2022.01) |
| *B01J 2/00* | (2006.01) |
| *B01J 2/12* | (2006.01) |
| *B01F 29/25* | (2022.01) |
| *B01F 29/60* | (2022.01) |
| *B01F 101/06* | (2022.01) |
| *B01F 101/18* | (2022.01) |
| *A01C 1/06* | (2006.01) |
| *A23P 20/12* | (2016.01) |
| *B05C 3/08* | (2006.01) |

(52) U.S. Cl.
CPC .......... *B01F 29/251* (2022.01); *B01F 29/252* (2022.01); *B01F 29/61* (2022.01); *B01F 29/64* (2022.01); *B01F 33/82* (2022.01); *B01J 2/006* (2013.01); *B01J 2/12* (2013.01); *B05B 13/0235* (2013.01); *B05B 13/0257* (2013.01); *B07B 1/22* (2013.01); *B65G 33/14* (2013.01); *B65G 45/005* (2013.01); *A01C 1/06* (2013.01); *A23P 20/12* (2016.08); *A23P 20/15* (2016.08); *B01F 2101/06* (2022.01); *B01F 2101/18* (2022.01); *B05C 3/08* (2013.01); *B65G 2812/0583* (2013.01)

(56) References Cited

U.S. PATENT DOCUMENTS

| | | | | |
|---|---|---|---|---|
| 4,465,017 | A * | 8/1984 | Simmons | ........... A01C 1/06 47/DIG. 9 |
| 4,730,934 | A | 3/1988 | Schwing | |
| 4,952,224 | A | 8/1990 | Lilakos | |
| 6,328,798 | B1 * | 12/2001 | Bostrom | ........... B29B 7/94 118/24 |
| 6,365,203 | B2 * | 4/2002 | Degady | ........... A23G 3/26 426/5 |
| 6,415,909 | B1 * | 7/2002 | Mitchell | ........... B65G 19/14 198/716 |
| 9,055,767 | B2 | 6/2015 | Stacy et al. | |
| 2009/0092752 | A1 * | 4/2009 | Brandt, Jr. | ........... A23P 20/15 118/19 |
| 2010/0242838 | A1 * | 9/2010 | Fukumori | ........... A23P 20/13 118/58 |

FOREIGN PATENT DOCUMENTS

| | | |
|---|---|---|
| CA | 2825138 A1 | 7/2012 |
| EP | 2129581 A2 | 12/2009 |
| WO | 03079803 A2 | 10/2003 |
| WO | 2017136779 A1 | 8/2017 |
| WO | 2018139932 A1 | 8/2018 |

* cited by examiner

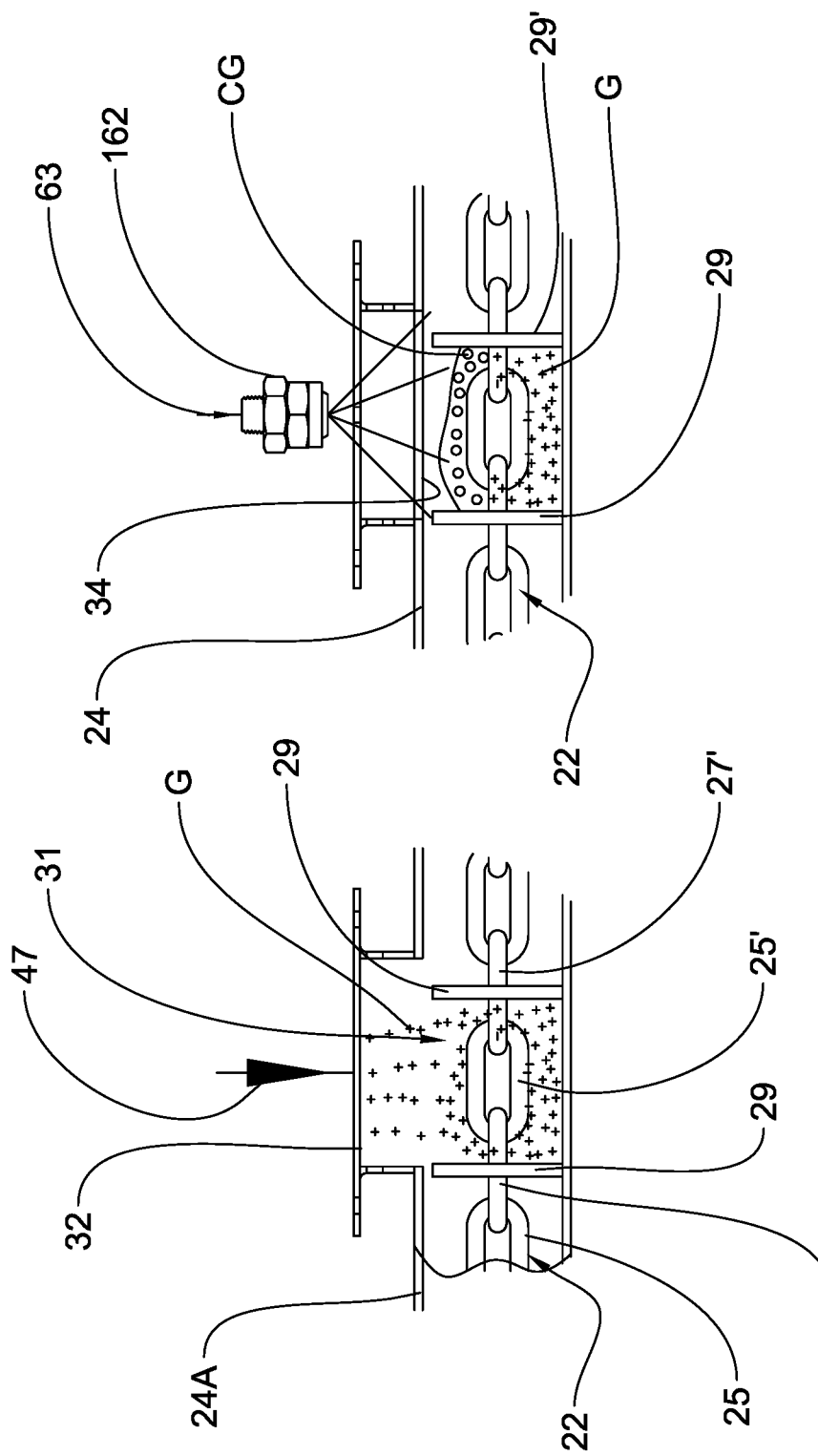

US 11,612,868 B2

IN-LINE FLAVORING GRANULAR AND POWDER CONVEYOR SYSTEM

CROSS-REFERENCE TO RELATED APPLICATIONS

This patent application is a United States National Stage of International Patent Application No. PCT/CA2018/051415, filed on Nov. 8, 2018, which in turn claims priority to U.S. Provisional Application No. 62/619,436, filed on Jan. 19, 2018, and U.S. Provisional Application No. 62/585,700, filed on Nov. 14, 2017. The entire disclosures of the above patent applications are hereby incorporated herein by reference.

FIELD OF THE INVENTION

The present invention relates to in line flavoring conveyor systems that are used in the food, to animal feed, industrial and agricultural business, where quality control is paramount. In particular, the present invention relates to self-contained conveyor systems that enable fluid compound coating of granular and powder food feed and chemical particles, either wet or dry, at the highest food and feed industries standards. In one embodiment, the coating compound is a flavour compound. The present invention also relates to an integral Clean-In-Place cleaning system for removing first flavour compound and the respective odor from flavour from said tubular conveyor assembly system before use of a second flavour compound.

SUMMARY OF THE INVENTION

The invention relates to a granular coating conveyor system for coating granular particles along a conveyor member, said conveyor system defining a tubular member through which is axially movable said conveyor member, said conveyor member defining a plurality of successive compartments for each receiving a plurality of said granular particles, drive means powering said conveyor member, coating fluid feed means feeding coating fluid onto said granular particles through coating fluid spray means, a blender member coaxially mounted to said tubular member with a tubular member upstream granular particles discharge port from said compartments and a tubular member downstream granular particles return ingress port into said compartments for through passage of said granular particles, rotating means rotating said blender member axially of said tubular member, and coated granular particles outlet means on said tubular member located downstream of said blender member;

wherein said blender member consists of an open drum, said coating fluid spray means including at least one stationary radial nozzle member inside said drum, said granular particle upstream discharge port made in said tubular member located at an upstream interior portion of said drum for granular particles escape from said compartments into said drum, a mixing and conveying means integral to said drum and axially engaging and moving said granular particles having escaped inside said drum through said upstream discharge port and mixing in tumbling fashion said granular particles with said coating fluid with such a granular particles load that a kidney shape mass of granular particles is dynamically formed, said tubular member downstream return ingress port located at a downstream interior portion of said drum for coated to granular particles return ingress from said drum into said tubular member.

In one embodiment, said mixing and conveying means consists of a helicoidal spiral screw member integrally mounted to an interior peripheral wall face of said drum and extending therealong radially outward of said tubular member, and mixing and guiding therealong said granular particles. Said spiral screw member may be cross-sectionally polygonal, for example quadrangular in cross-section.

In one embodiment, said conveyor member is a shaft screw conveyor. In another embodiment, said conveyor member is a shaftless flexible screw conveyor.

In one embodiment, there is further included a secondary granular particles coating blender defining a secondary drum, rotatably mounted to said tubular member and located intermediate said coated granular particles outlet means and the first mentioned blender member, said coating fluid spray means further including at least another stationary radial nozzle member inside said secondary drum.

In one embodiment, there is further including a cylindroid screener, carried radially outwardly of said drum and rotating therewith and having a number of peripheral slits for centrifugal escape of undersized said granular particles.

In one embodiment, the shaft screw conveyor is of the endless type, and further including a continuous chain tensioner could be added at one elbowed end portion of said shaft screw endless conveyor.

Said coating fluid could be selected from the group comprising liquid flavour and fragrance.

In one embodiment, said tubular member downstream return ingress port for said coated granular particles includes segregated oversized first granular particles outlet and non-oversized second granular particles outlet.

In one embodiment, there is further included dry ice Clean-In-Place feed means, feeding dry ice inside said tubular member between two granular particle coating operations, to remove coating fluid traces remaining from a first granular particles coating operation before starting a second granular particles coating operation.

In one embodiment, a magnetic member is mounted integral to said coated granular particles outlet means, for screening metallic contaminants apart from coated granular particles.

The invention also relates to a blender for use in said granular coating conveyor system. In one embodiment of such blender, said mixing and conveying means consists of a helicoidal spiral screw member integrally mounted to said drum and extending therealong radially outwardly of said tubular member, for mixing in tumbling fashion said granular particles with coating fluid and for guiding therealong said granular particles. Said spiral screw member may be for example cross-sectionally quadrangular.

BRIEF DESCRIPTION OF THE DRAWINGS

FIGS. 6 and 7 are enlarged sectional views of the areas circumscribed by circular windows 6 and 7 of FIG. 5, respectively;

DETAILED DESCRIPTION OF THE EMBODIMENT OF THE INVENTION

Figure 1:
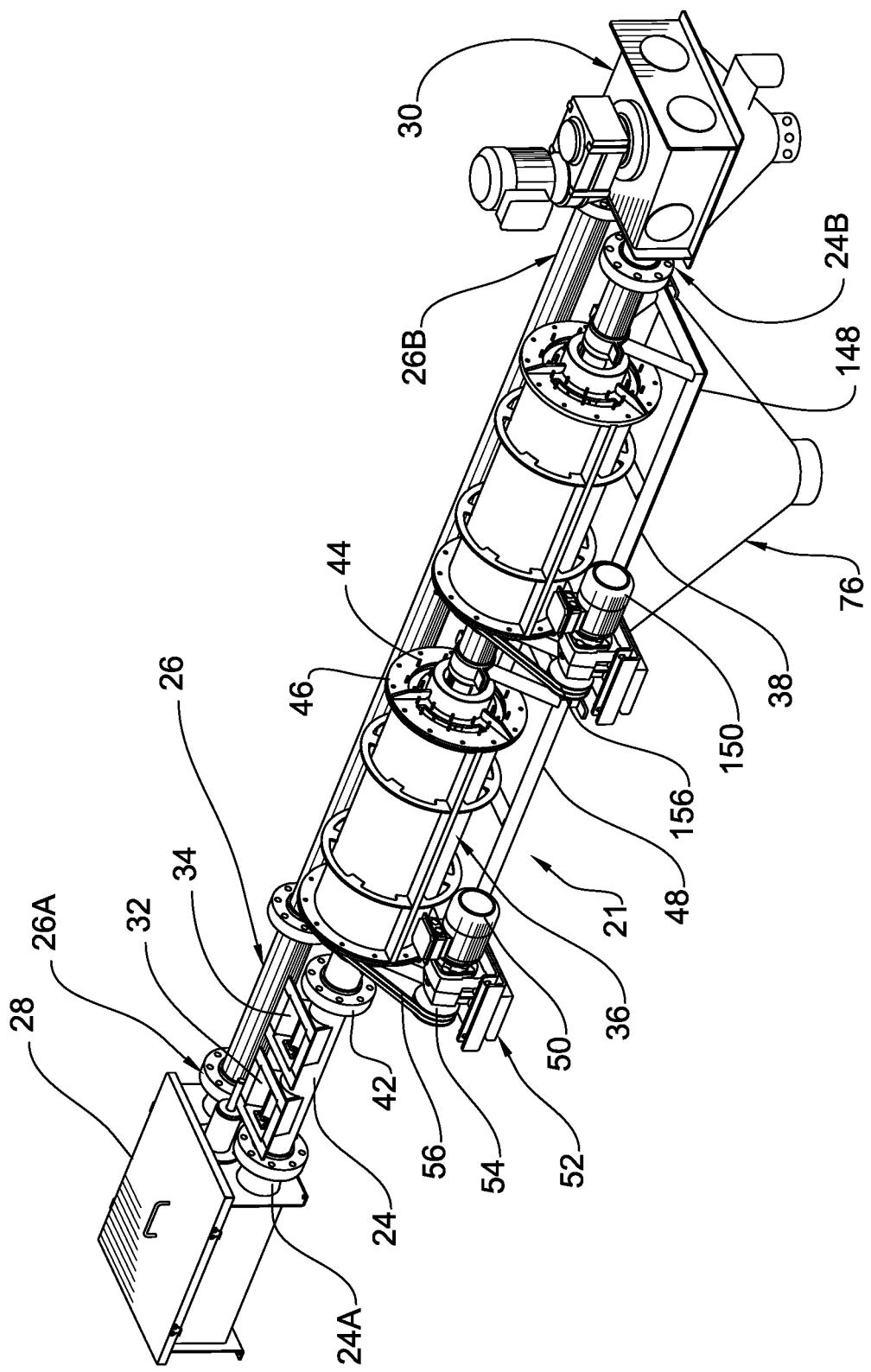
FIGS. 1 and 1A are enlarged top and bottom isometric views respectively of a first embodiment of the granular coating conveyor system according to the invention, with the cover segment of the blender station thereof in FIG. 1 being open for clarity of the view.
Figure 1A:
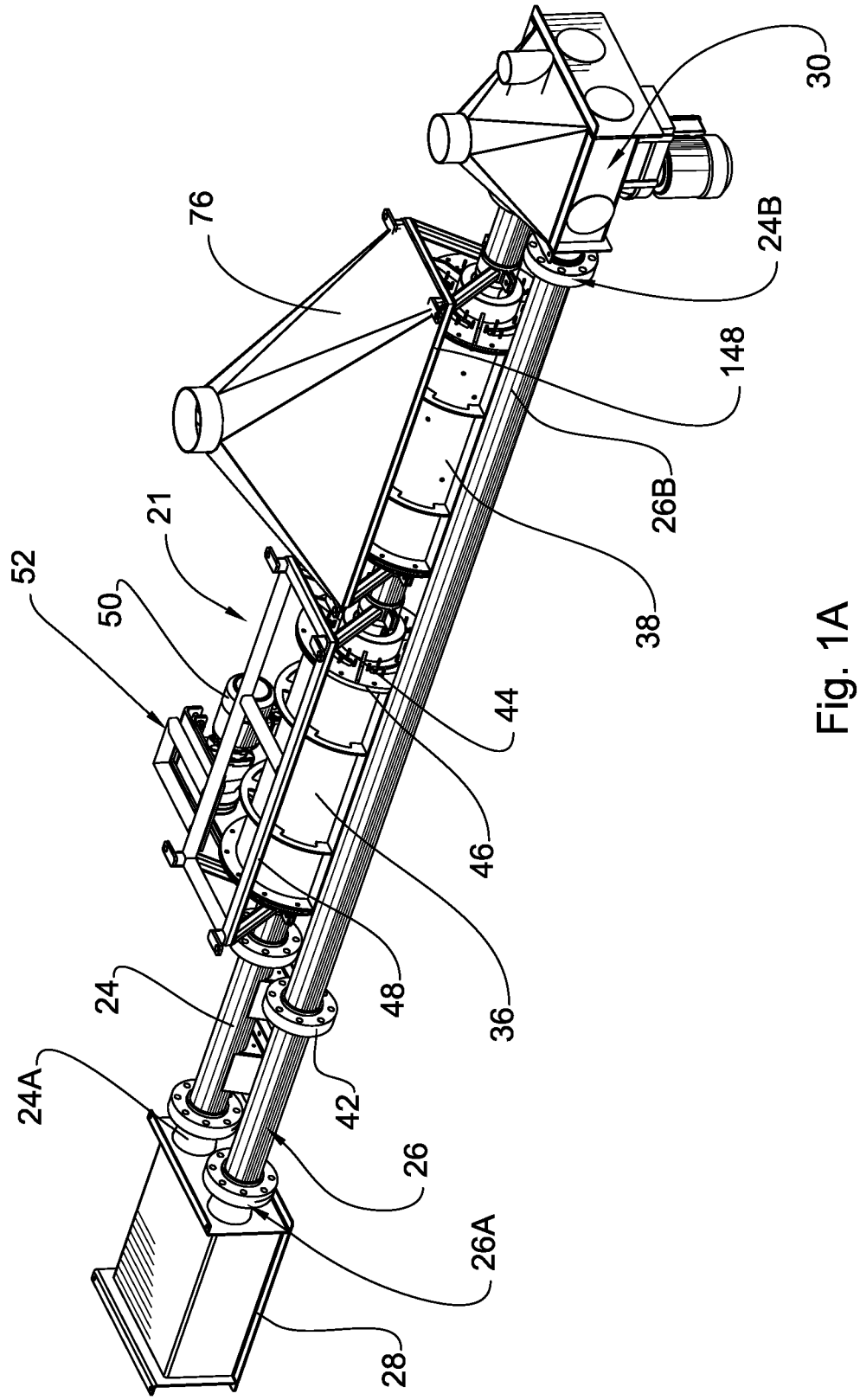

In a first embodiment of the invention illustrated in FIGS. 1 to 11 of the drawings, there is disclosed a conveyor system 21 defining an endless generally ovoidal loop chain 22 moving through two parallel laterally spaced tubular members 24, 26.

In one embodiment, a continuous drag chain tensioner station 28 operatively interconnects one inner end portion 24A, 26A of tubular members 24, 26, respectively, while a chain drive station 30 interconnects the opposite outer end portion 24B, 26B of tubular members 24, 26, respectively, in self-contained fashion. Chain tensioner station 28 may be for example of the type as manufactured by the Canadian corporation Luxme international ltd, Brossard (Quebec) Canada.

A granular & powder intake feed first port 32 is formed tangentially at the top of inner end portion 24A adjacent chain tensioner station 28. A granular feed line 47 feeds granules G to intake port 32, via a flow control flow meter 49. A flavoring or coating compound intake feed second port 34 is also formed tangentially at the top of inner end portion outwardly of first port 32 relative to chain tensioner station 28.

In one embodiment, chain 22 is made of first and second ovoidal planar links 25, 27, 25', 27', . . . alternating orthogonally relative to one another in successive pairs, respectively, so that each pair of consecutive spaced links 25, 25', are separated by an intermediate link 27 orthogonal to both links 25, 25'. To each succesively spaced link 27, 27', . . . is integrally mounted a partition gate 29, 29', . . . respectively wherein each pair of successive partition gate 29, 29', . . . define therebetween a compartment 31 for receiving a number of granules G and for conveying same along tubular member 24.

A blender station 36 is mounted on tubular member 24 intermediate opposite end chain tensioner stations 28 and chain drive station 30, for progressively coating flavor compound onto the external surface of granular & powder particles. A screener station 38 is further mounted on tubular member 24 intermediate blender station 36 and chain drive station 30, for coated particle size separation according to set particle size thresholds and distribution.

In one embodiment, blender station 36 consists of a cylindroid drum 40 diametrically larger than tubular member 24, drum 40 being rotatably carried around tube tubular member 24 by opposite ends ball/sleeve bearing inner and outer rings 42, 44, interconnected to drum by radial brackets 46. Drum 40 includes opposite transverse upstream and downstream end walls 67, 71 respectively. A stationary U-shape frame 48 is mounted to tube tubular member 24 radially outwardly of rotating drum 40, and carries an electric motor 50 in radially transverse register with inner ring 42. Motor 50 includes a protruding rotating shaft 52 axially driving a gear wheel/pulley 54. An endless drive belt 56 operatively interconnects another gear wheel/pulley 55 at inner ring 42 with gear wheel/pulley 54, so that motor 50 drives drum 40 into rotation around tubular member 24. An access door 40A is hinged at 40B to drum 40, thus revealing a maintenance access window 58. The interior face of door 40A is lined with a few apertures 60 each accommodating a nozzle 62 for radially inward spraying of flavour compound C onto granular & powder particles G, wherein a coated flavored granular & powder compound CG is formed. In one embodiment, a flavour compound spray nozzle 162 is further added upstream at compound intake port 34.

Coating fluid feed lines 63, 65, feed coating fluid to upstream nozzle 162 and to downstream drum nozzles 62. Feed line 65 includes a stationary feed line extension 65A passing through an annular aperture 67A made in the upstream upright transverse end wall 67 of rotatable drum 40. A valve 69 on feed line 65 proximate blender drum 40 controls coating fluid flow rate. Stationary feed line extension 65A extends radially outwardly of tubular member 24 in generally radially offset parallel fashion. Stationary feed line extension 65A and associated stationary coating fluid spray nozzles 62, 62', 62", peripherally clear the rotating spiralling element 64.

Figure 4:
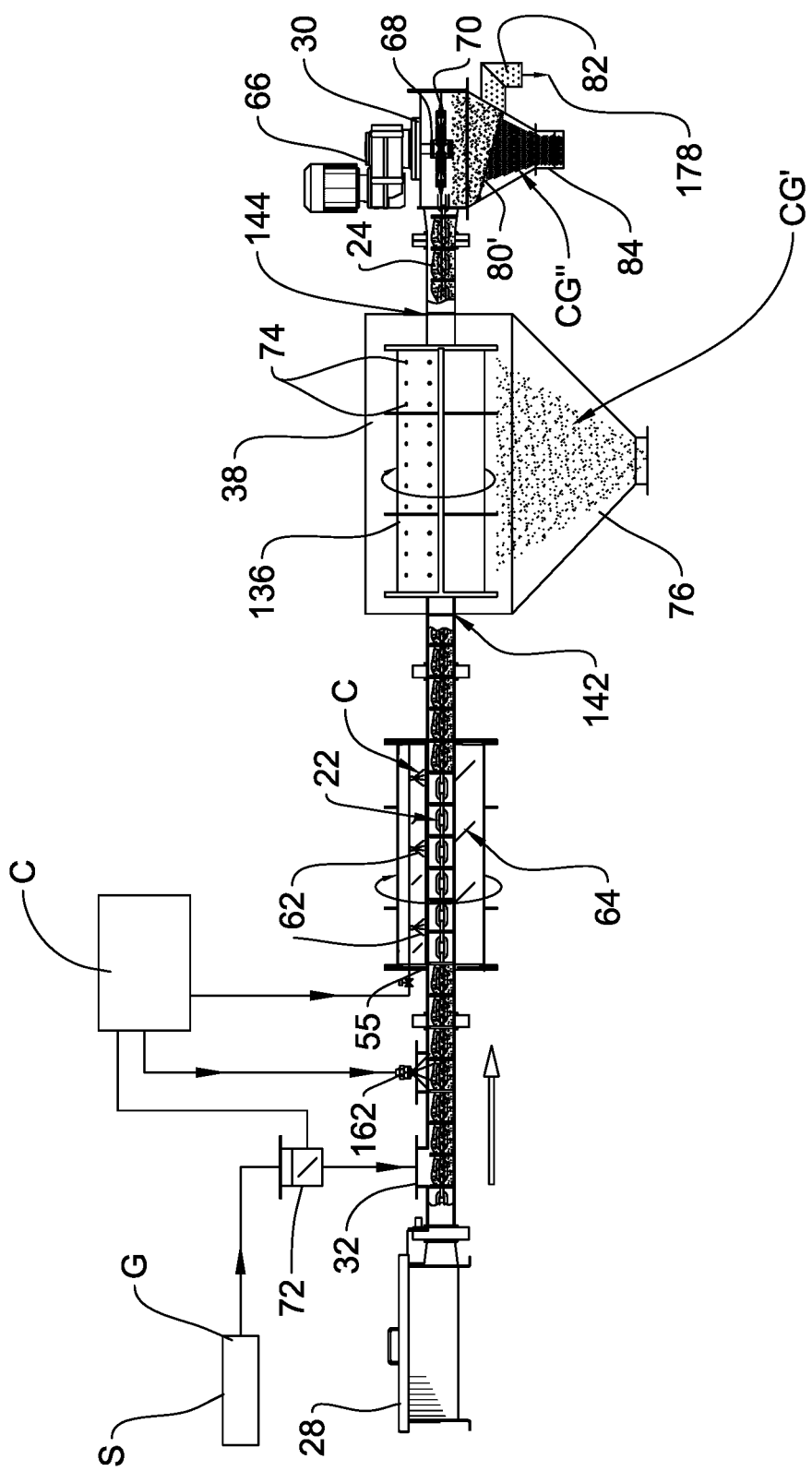
FIGS. 4 and 5 are partly sectional elevational views of the granular & powder flavoring conveyor system of FIG. 1 but at a smaller scale, sequentially suggesting how granular & powder material from the source on the left hand side end is progressively coated with flavoring fluid or powder from left to right of the figure and then reclaimed at the right hand side thereof.
Figure 8:
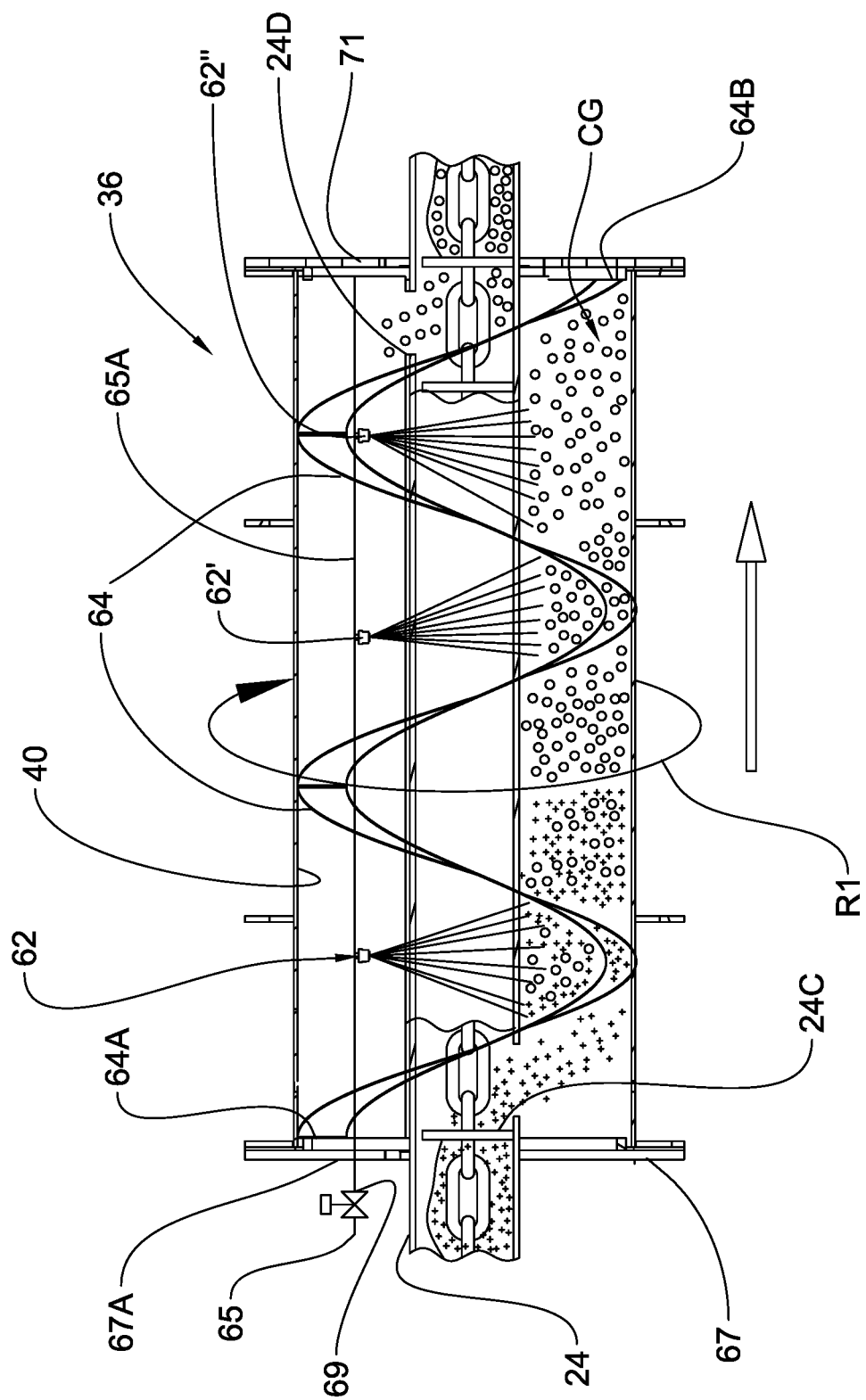
FIG. 8 is an enlarged sectional view of the flavoring blender of FIG. 4 or 5.
Figure 8A:
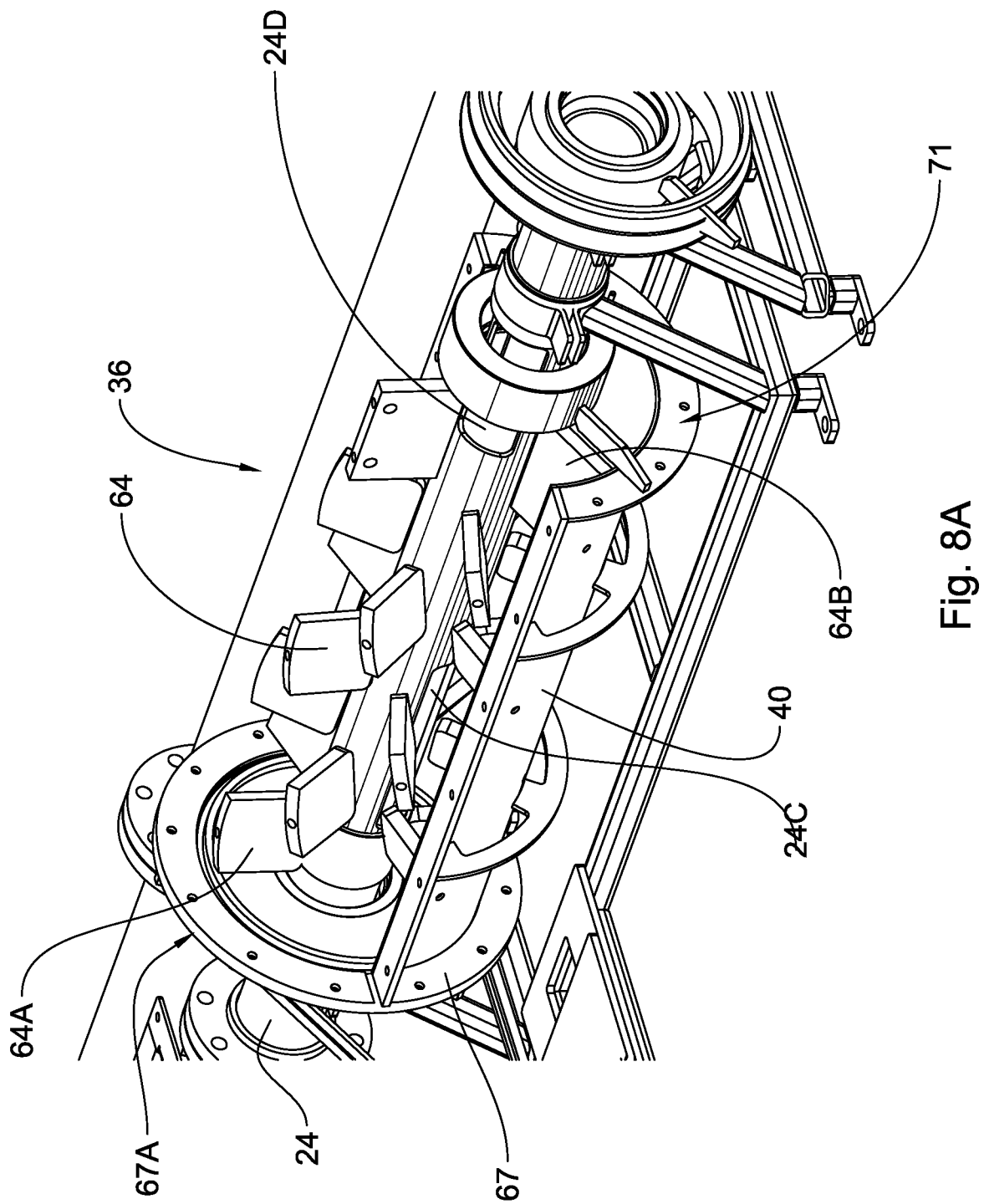
FIG. 8A is an isometric inside view of the interior of the blender station, with the top half portion of the drum peripheral wall being removed for clarity of the view.

As best shown in FIGS. 4 and 8 of the drawings, blender station 36 further defines an elongated integral helicoidal spiralling element 64 rotating with drum 40. In one embodiment, spiralling element is cross-sectionally polygonal, for example quadrangular such as square or rectangular. Spiralling element 64 axially conveys granules G from upstream to downstream ends of rotating drum 40. The cylindroid wall of tubular member 24 opens into the enclosure of bottom drum 40 at bottom aperture 24C so that granules G fall into drum 40 at an upstream portion of the bottom floor thereof proximate upstream annular aperture 67A. Rotating spiralling element 64 thus axially moves granules G under mixing action therebetween and under vaporizing coating action from nozzles 62, 62', 62", so as to provide optimized distribution of flavoring compound C from spray nozzles 62 onto granular & powder particles G at CG.

Coated granular particles CG then escape from the enclosure of drum 40 back onto tube tubular member 24 through downstream end top tubular member aperture 24D. Downstream aperture 24D is located radially outwardly upwardly of tubular member 24, while upstream aperture 24C is located radially outwardly downwardly thereof. The opposite ends 64A, 64B, respectively of spiralling element 64 are integrally mounted to the radially outwardmost upper and lower interior portion of opposite transverse end walls 67, 71, respectively of drum 40 and the elongated main body of spiralling element 64 between walls 67 and 71 integrally engages the peripheral interior wall face of drum 40, so that spiralling element 64 rotates as one with drum 40.

Figure 10:
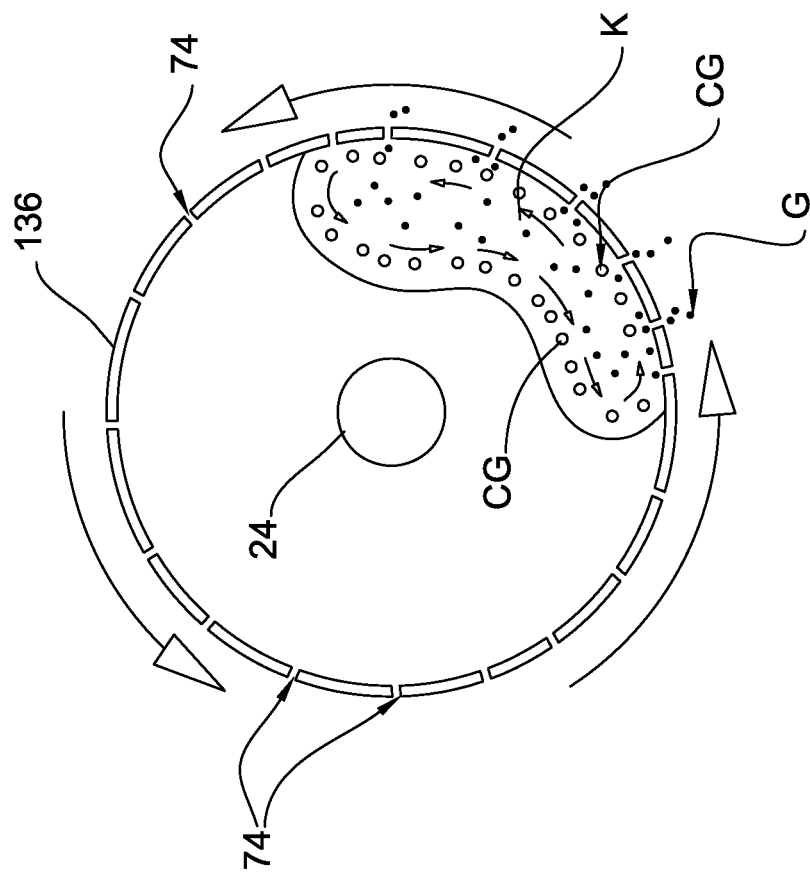
FIGS. 9 and 10 are partial schematic cross-sectional views of the blender and screener of FIG. 4 or 5, sequentially suggesting the dynamic mixing of uncoated and flavor coated granular & powder material.
Figure 9:
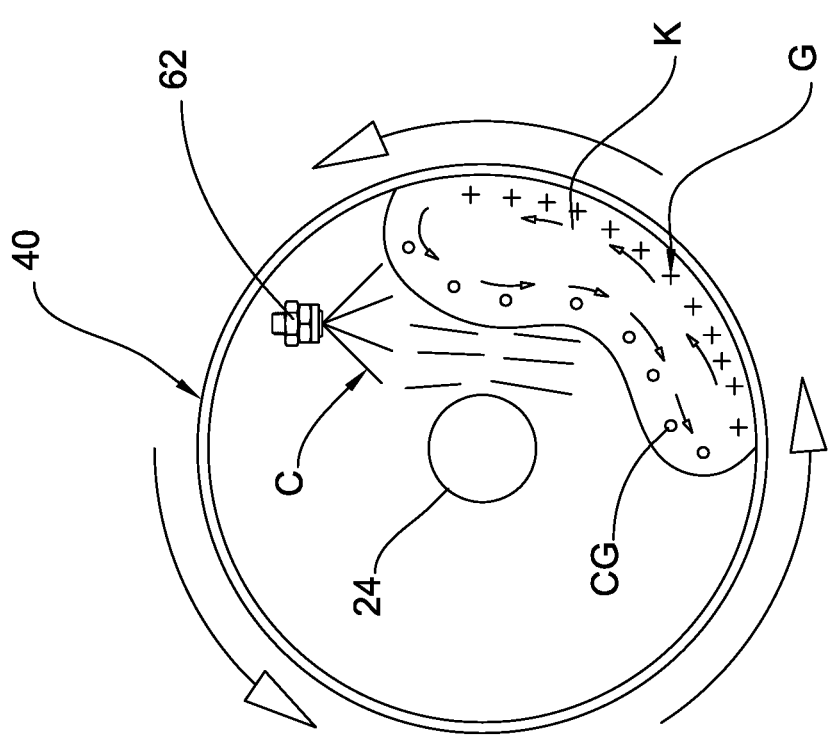

As suggested in FIGS. 9 and 10 of the drawings, helicoidal flights 64 promote optimum mixture of still uncoated granular particles G with flavour compound or coating C to form coated particles CG, wherein a dynamically evolving continuously tumbling kidney shape mass K of uncoated granular particles G and coated granular particles CG is formed and agitated as drum 40 rotates around conveyor tubular member 24, bringing fresh granular & powder to the top by circulation and exposure to the coating flavour sprayed by nozzles 62, 62', 62".

Chain drive station 30 includes a frame carrying a chain drive motor 66 which drives a vertically extending rotating axle 68. A horizontal gear wheel/pulley 70 is rotatably carried by axle 68, and chain 22 meshes with gear wheel/pulley 70 so that motion be imparted to chain 22 for endless rotation along tubular members 24 and 26 and through chain tensioner station 28 and chain drive station 30. In one embodiment of the invention, a granular powder particle flow meter 72 is operatively connected with the chain drive motor 66, e.g. via a variable frequency drive (VFD) unit (not shown), to coordinate chain rotation speed with feed rate of granular & powder particles G into tubular member 24.

A first screening station is provided at screener station 38. Screener station 38 includes a second radially enlarged drum 136 downstream of drum 36 and rotatably carried around tubular member 24 by ball/sleeve bearing rings 142, 144, and driven into rotation by motor 150 carried by frame 148 via drive belt 156 rotating along opposite gear wheels 154, 155. An access door 140A is hinged at 140B to the main body of drum 136. Access door 140a is lined with a plurality of outlet bores 74 having a diameter sized to allow free radially outward escape passage of granular coated particles CG of diametral sized below a first set threshold, at CG' in FIG. 4, for release through an underlying conical hopper 76 and into an undersized particle waste discharge container 78. In one embodiment, the set threshold diameter of bores 74 ranges between 3 to 25 millimeters, depending on the type of granulometry of the granular & powder particles. Other diametrical sizes of bores 74 are not excluded from the scope of the present invention. The particles CG of sufficient diametral size beyond said set threshold are allowed to continue along tubular member 24 toward the chain drive station 30.

As suggested in FIG. 10 of the drawings, rotation of drum 136 around tubular member 24 provides an optimum mixture of still uncoated granular particles G with flavour compound C to form coated particles CG, wherein a continuously tumbling kidney shape mass K of particles G and CG is formed and agitated as drum 136 rotates around conveyor tubular member 24. In one embodiment, the perforated drum 136 forms an interchangeable screen.

Figure 2:
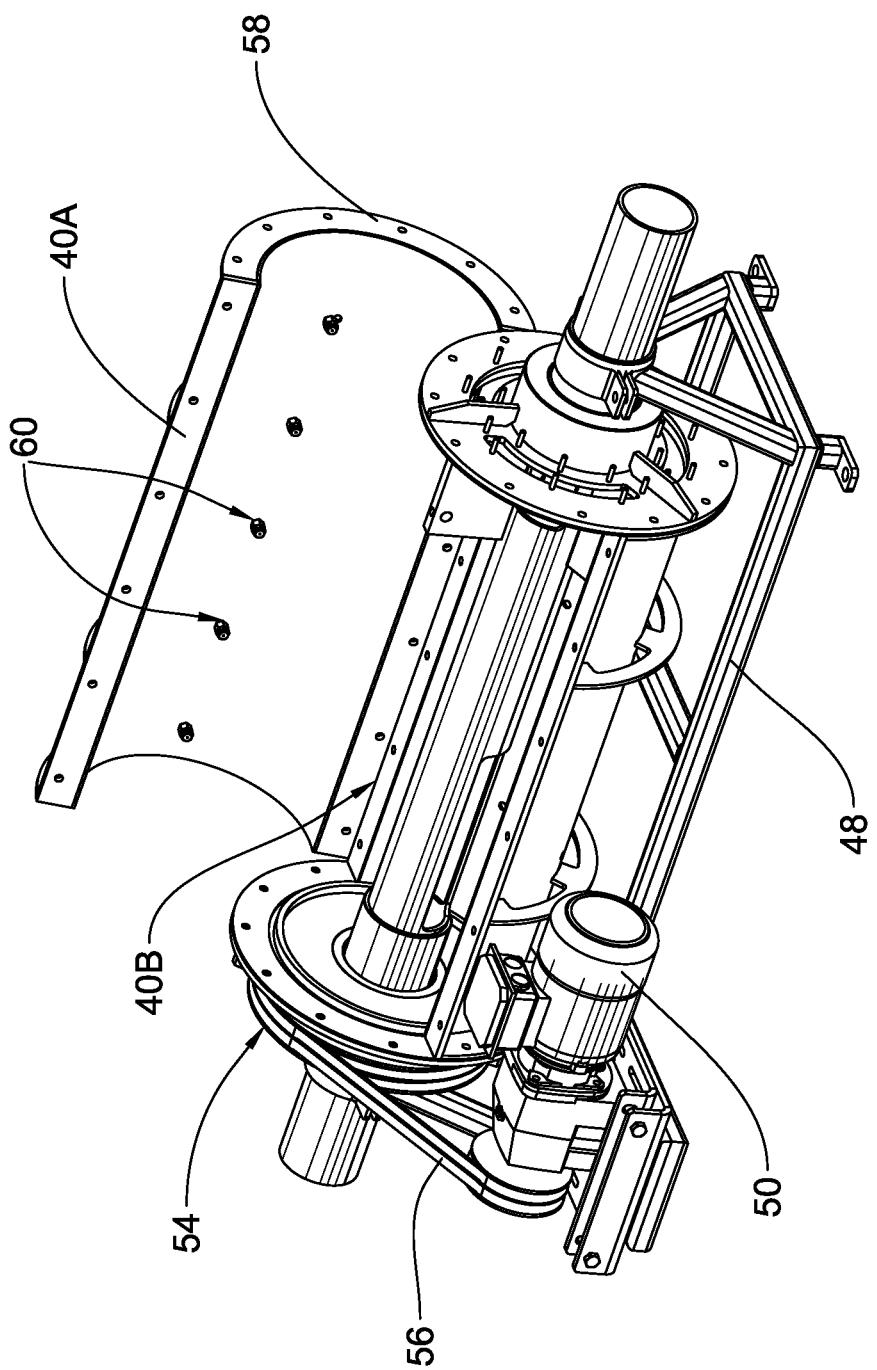
FIG. 2 is an isometric view of the separate blender station from FIG. 1, with its access door open.
Figure 3:
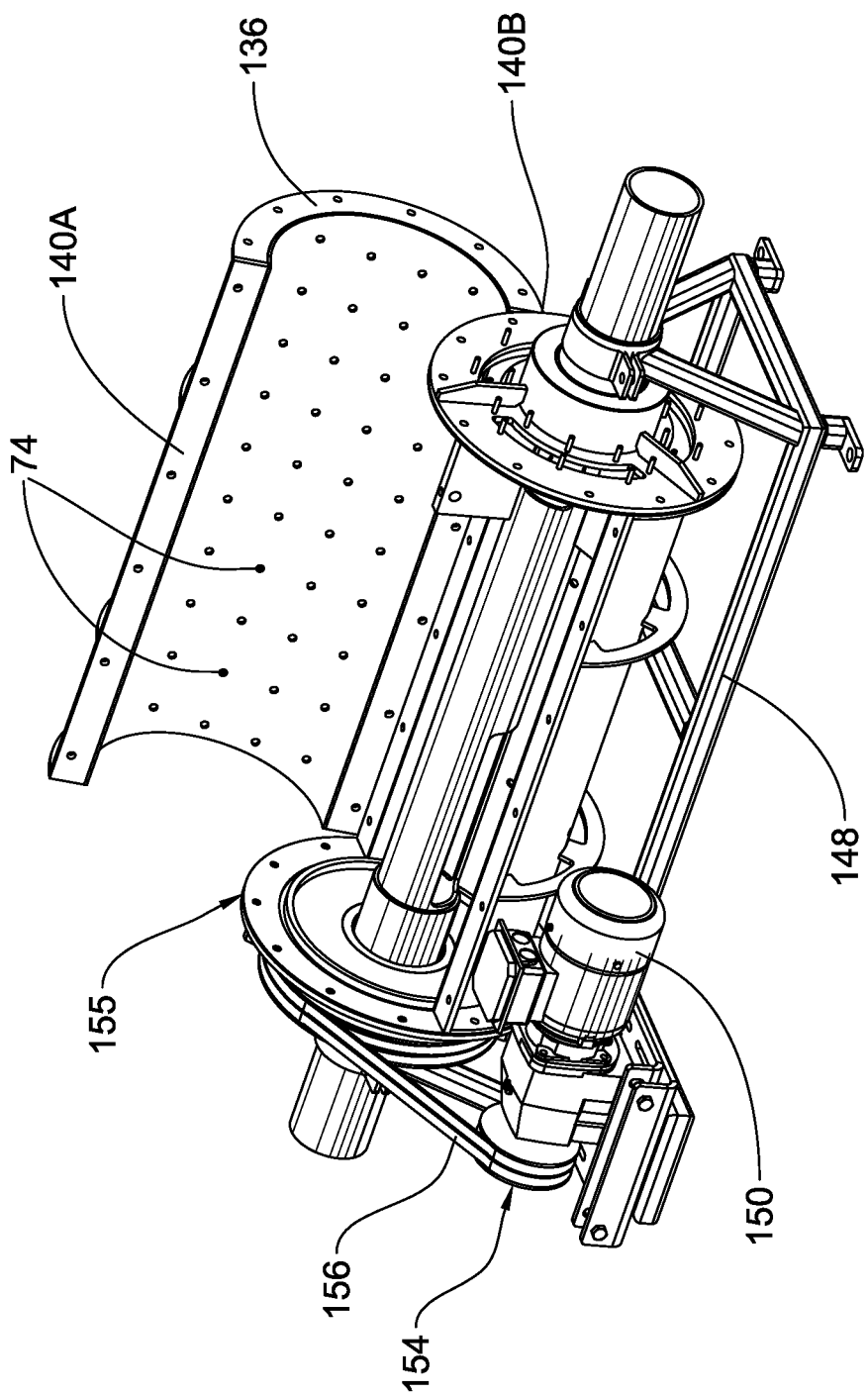
FIG. 3 is an isometric view of the rotating screener station from FIG. 1, with its access door open.
Figure 5:
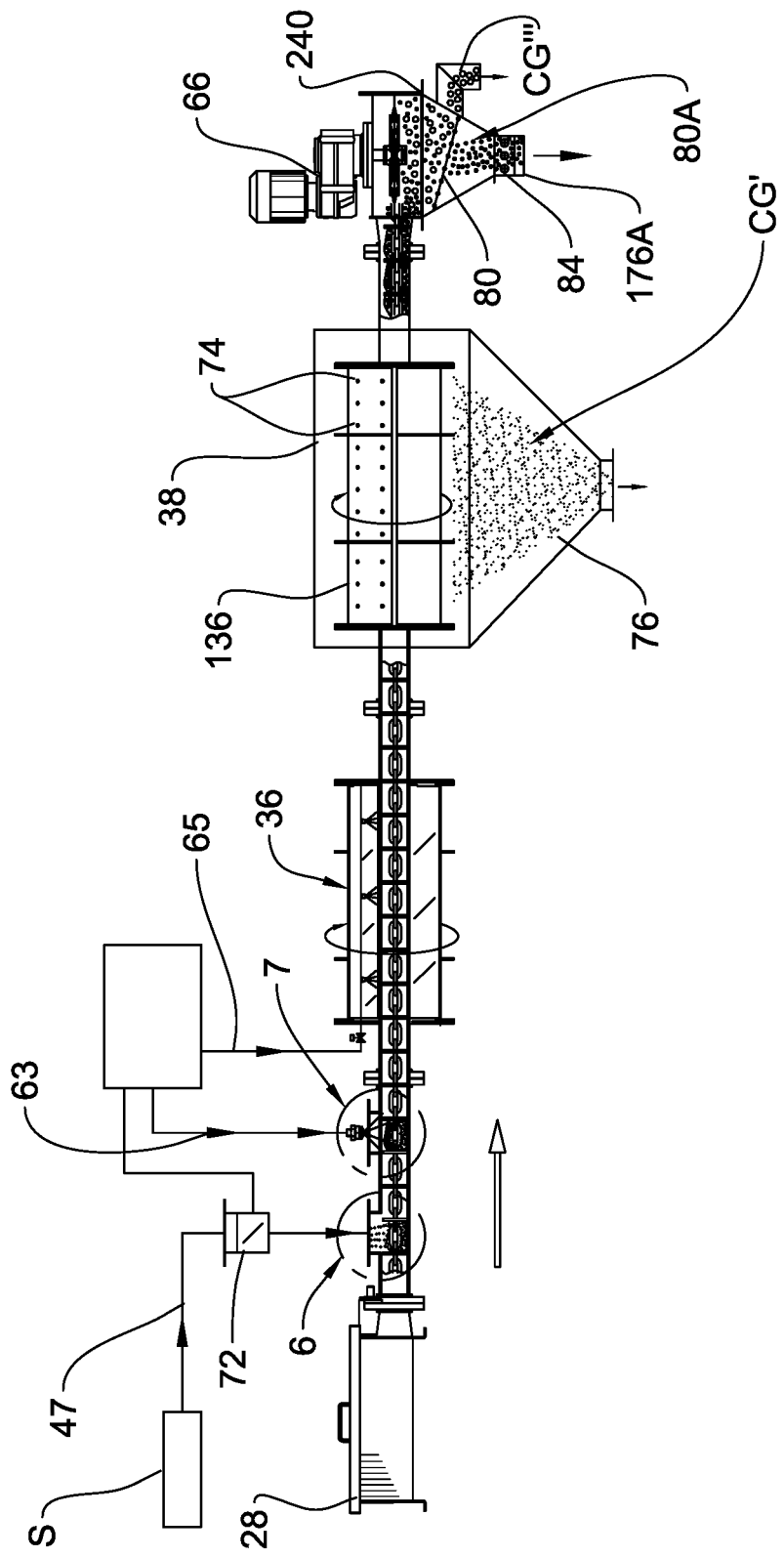

As best shown in FIGS. 2 and 5, chain drive station 30 includes a second screen station, defined by a flat inclined screen 80 beneath the tubular member 24. Tubular member 24 has downwardly opening mouth 24D at chain drive station 30, to allow free escape of coated particles CG therefrom. Screen 80 includes a plurality of outlet bores 80A having a diameter sized to allow free radially outward passage of coated particles CG diametrally sized below a second set threshold, at CG" in FIG. 4, for release through an underlying conical hopper 176 into an economic reclaim processing unit (not illustrated). The oversized particles CG''' of a diametral size beyond said second set threshold are discharged to an oversized particle container 178 via elbowed outlet duct 82.

Figure 11:
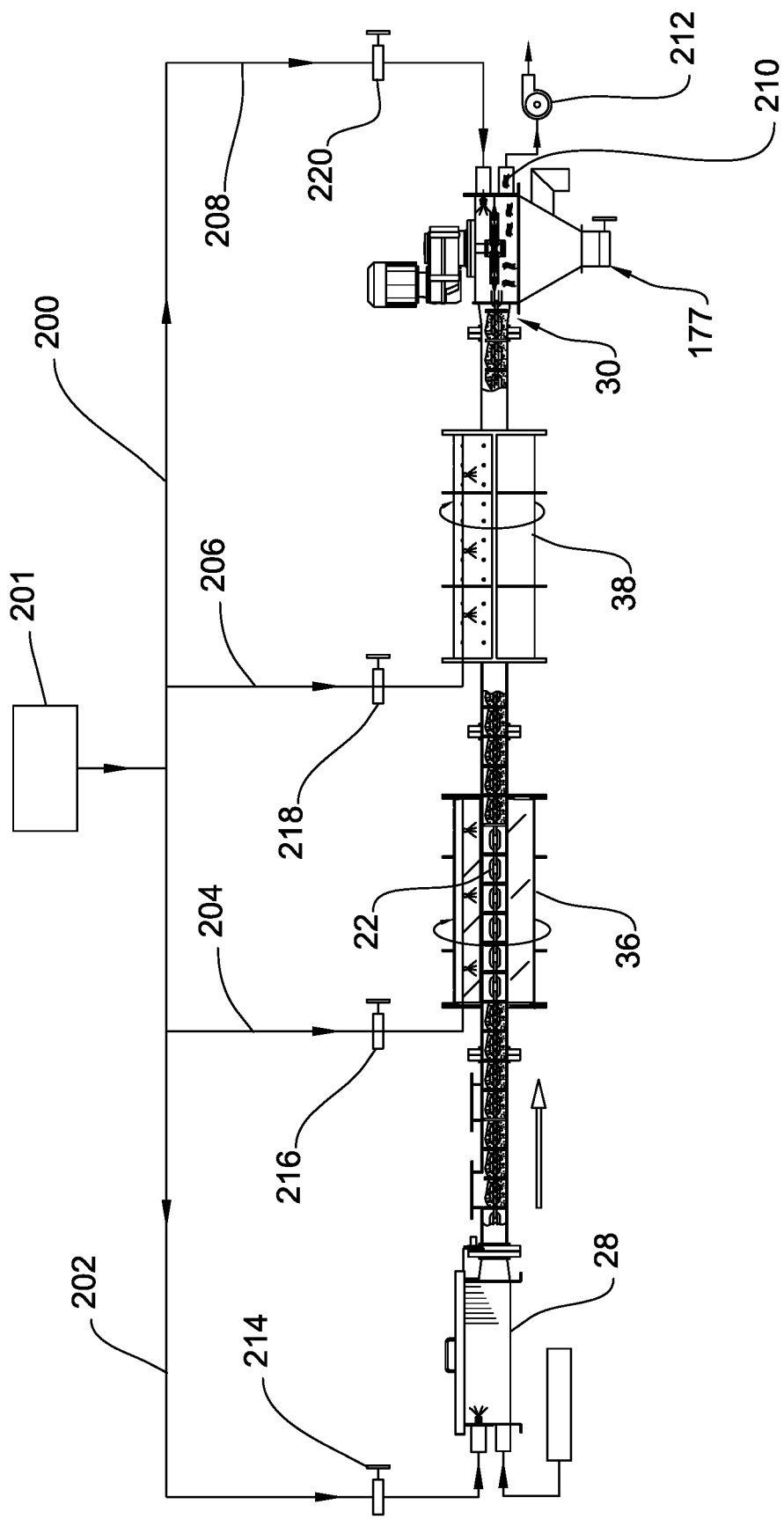
FIG. 11 is a view similar to FIG. 4 but further detailing the integral dry ice clean-in-place system for cleaning the conveyor after flavour spraying of granular & powder material has been completed, followed by the injection of ozone (O3) gas for the removal of odor.
Figure 12:
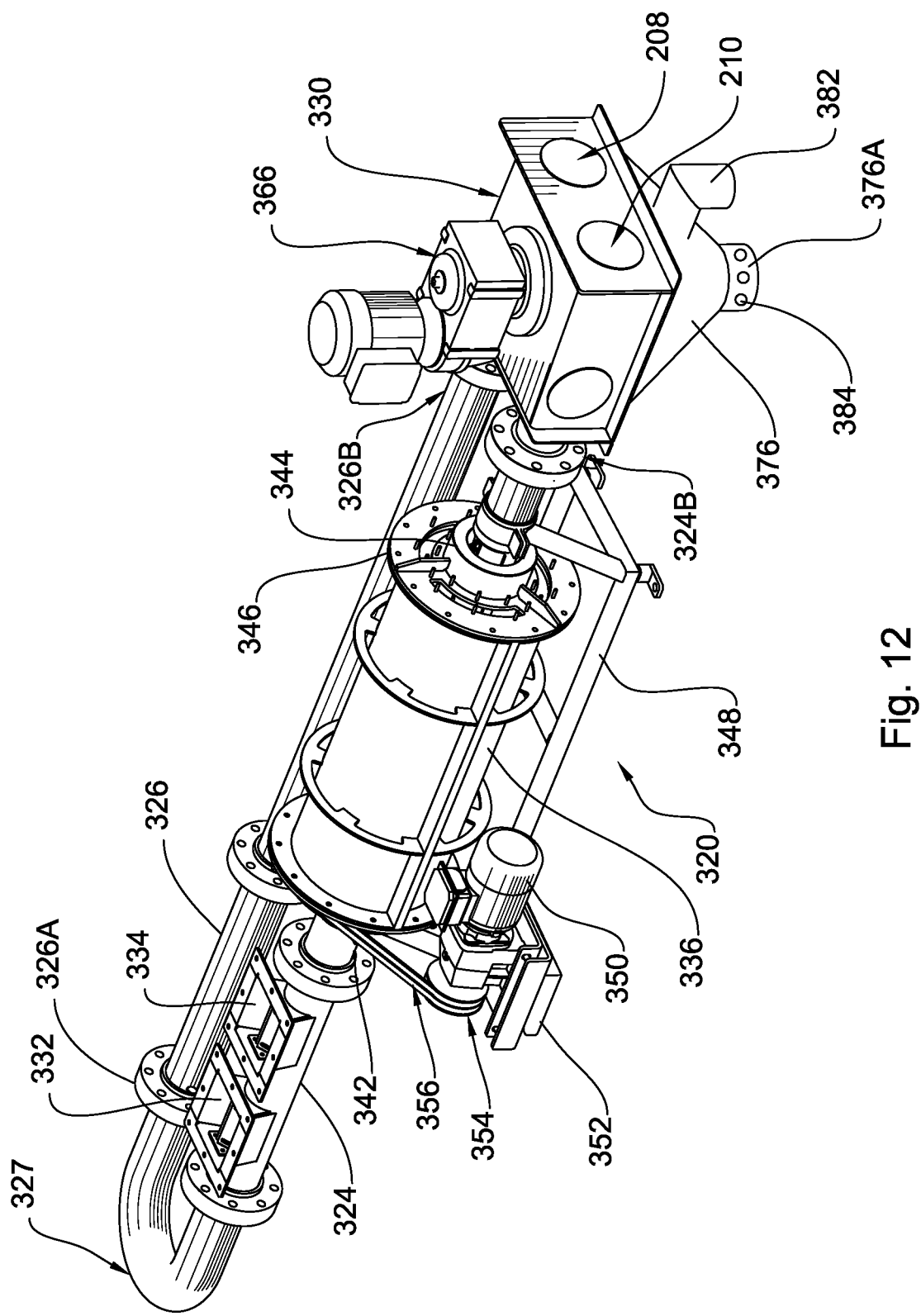
FIG. 12 is an isometric view of a second embodiment of granular and powder flavoring conveyor system according to the invention, with the continuous chain tensioner station of FIG. 1 being removed and replaced by a tubular U-bend connector and lacking an inline rotating screener and secondary blender.
Figure 13:
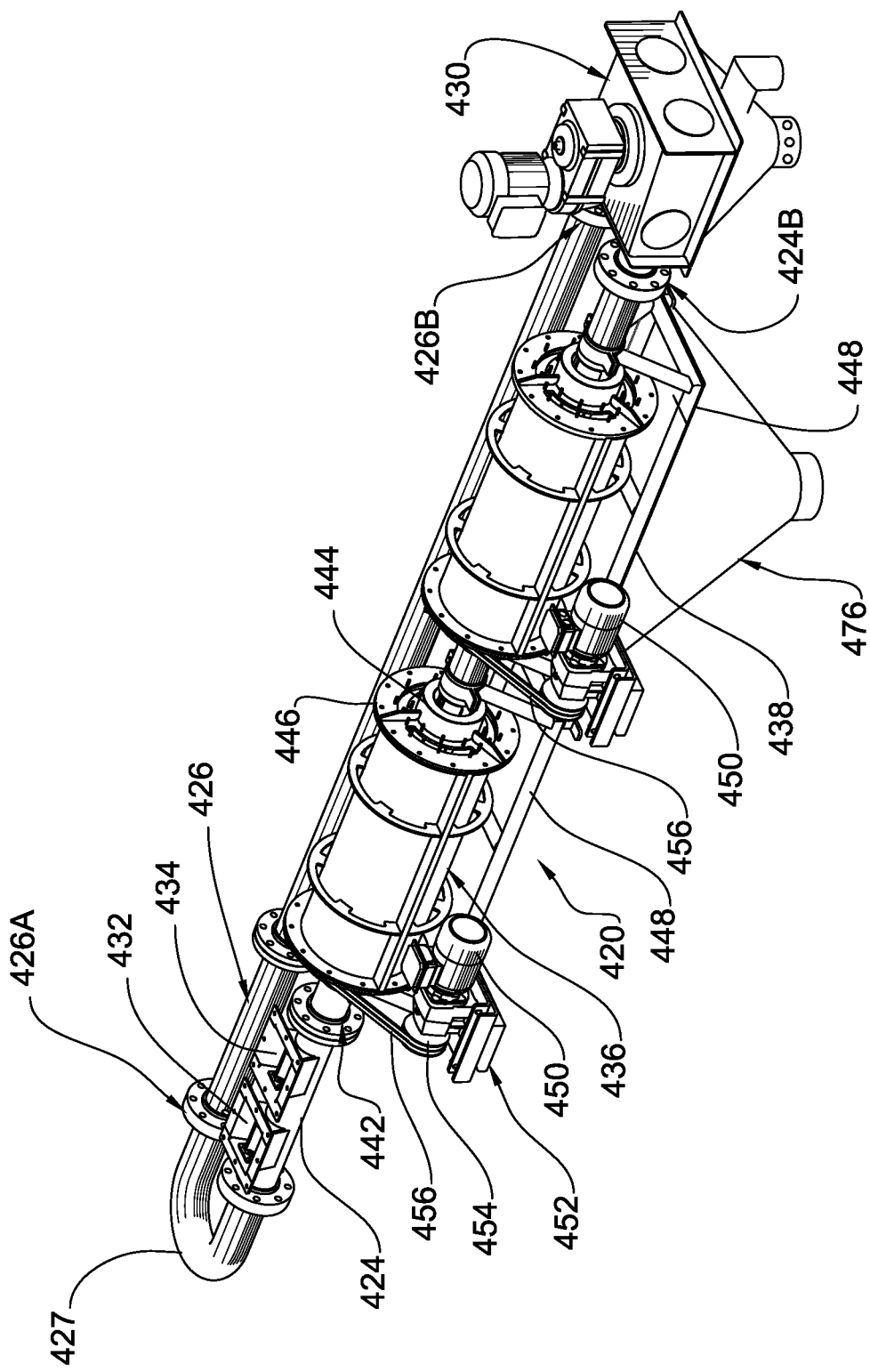
FIG. 13 is an isometric view of a third embodiment of granular and powder flavoring conveyor system according to the invention, similar to FIG. 12 but further comprising an in-line rotating screener and secondary blender.
Figure 14:
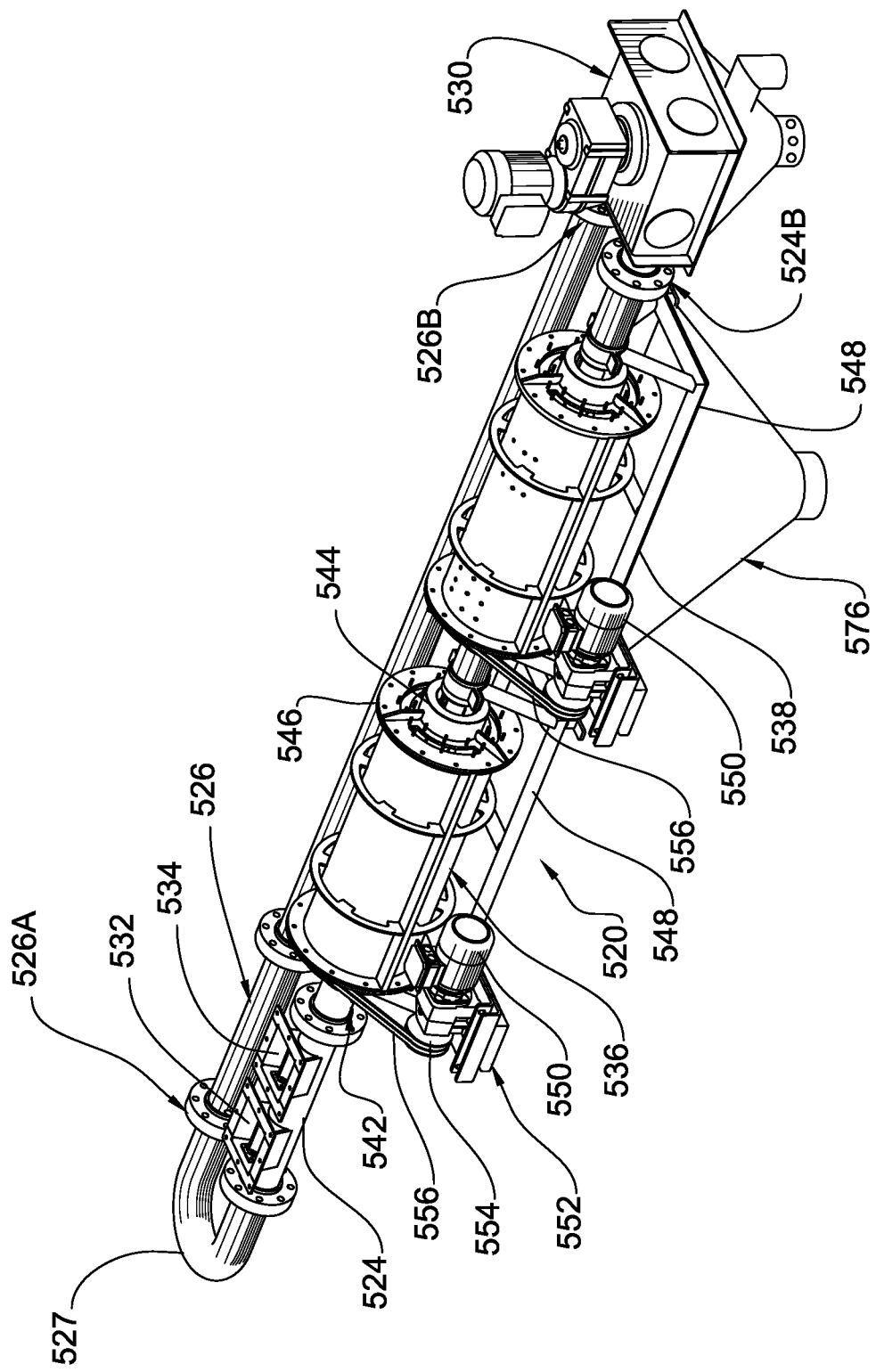
FIG. 14 is an isometric view of a fourth embodiment of granular and powder flavoring conveyor system according to the invention, and further comprising an in-line rotating screener but lacking a secondary blender.
Figure 15:
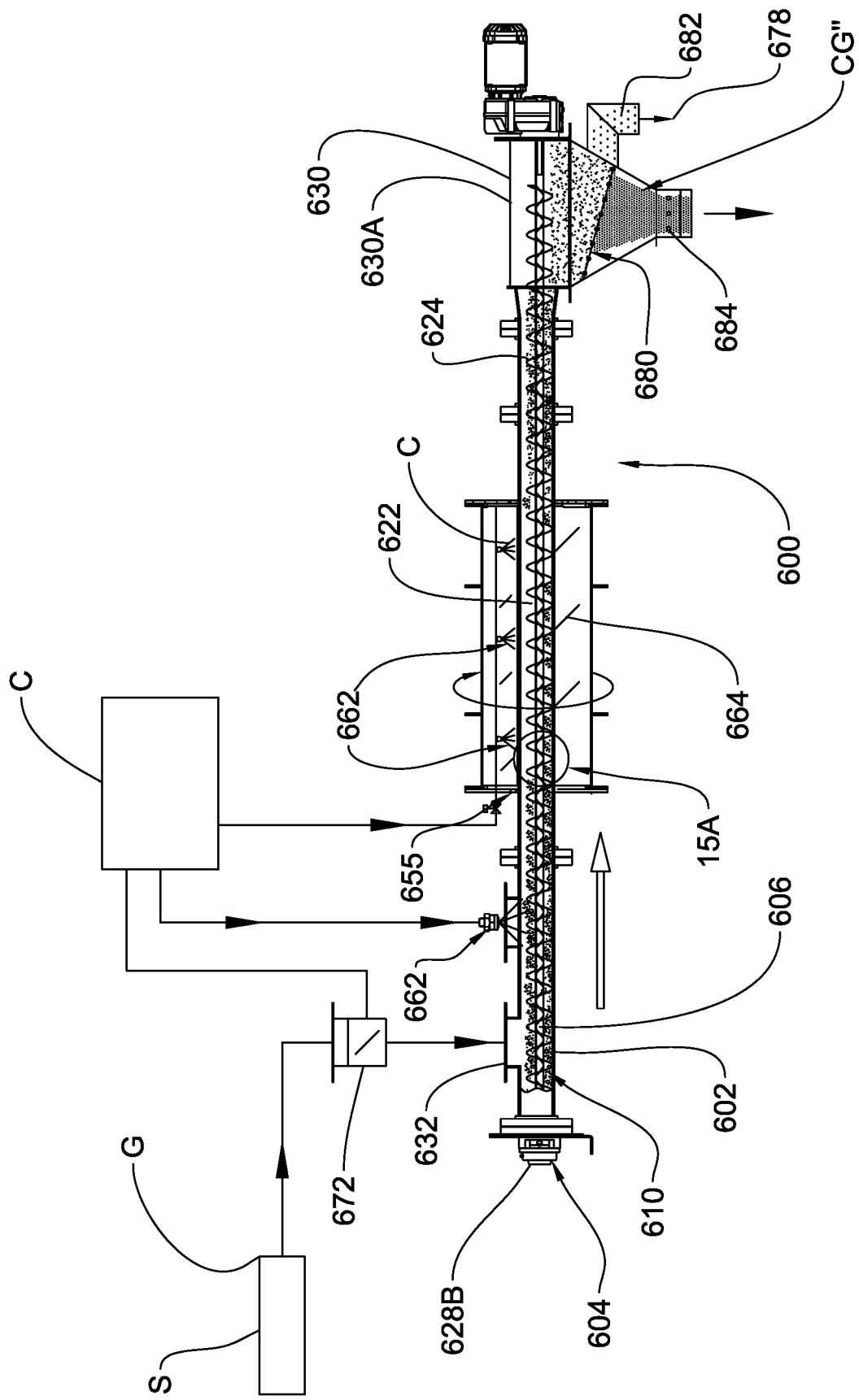
FIG. 15 is a partly sectional elevational view of a fifth embodiment of granular and powder flavoring conveyor system according to the invention, but with the tubular chain conveyor being replaced by an endless colinear shaft screw conveyor extending through a single tubular member (replacing the two parallel tubular members of the embodiment of FIG. 4) and with an in-line flavoring blender.
Figure 15A:
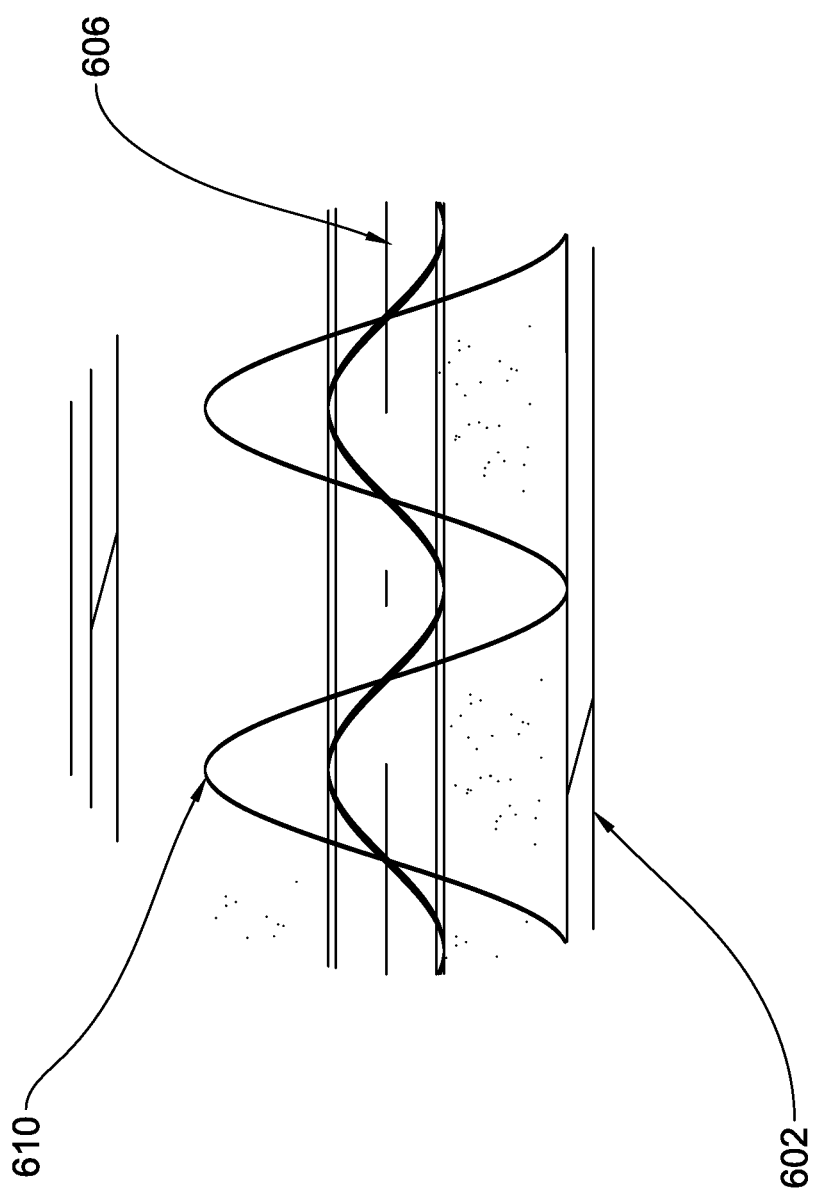
FIG. 15A is an enlarged view of the area circumscribed by circle 15A of FIG. 15.
Figure 16:
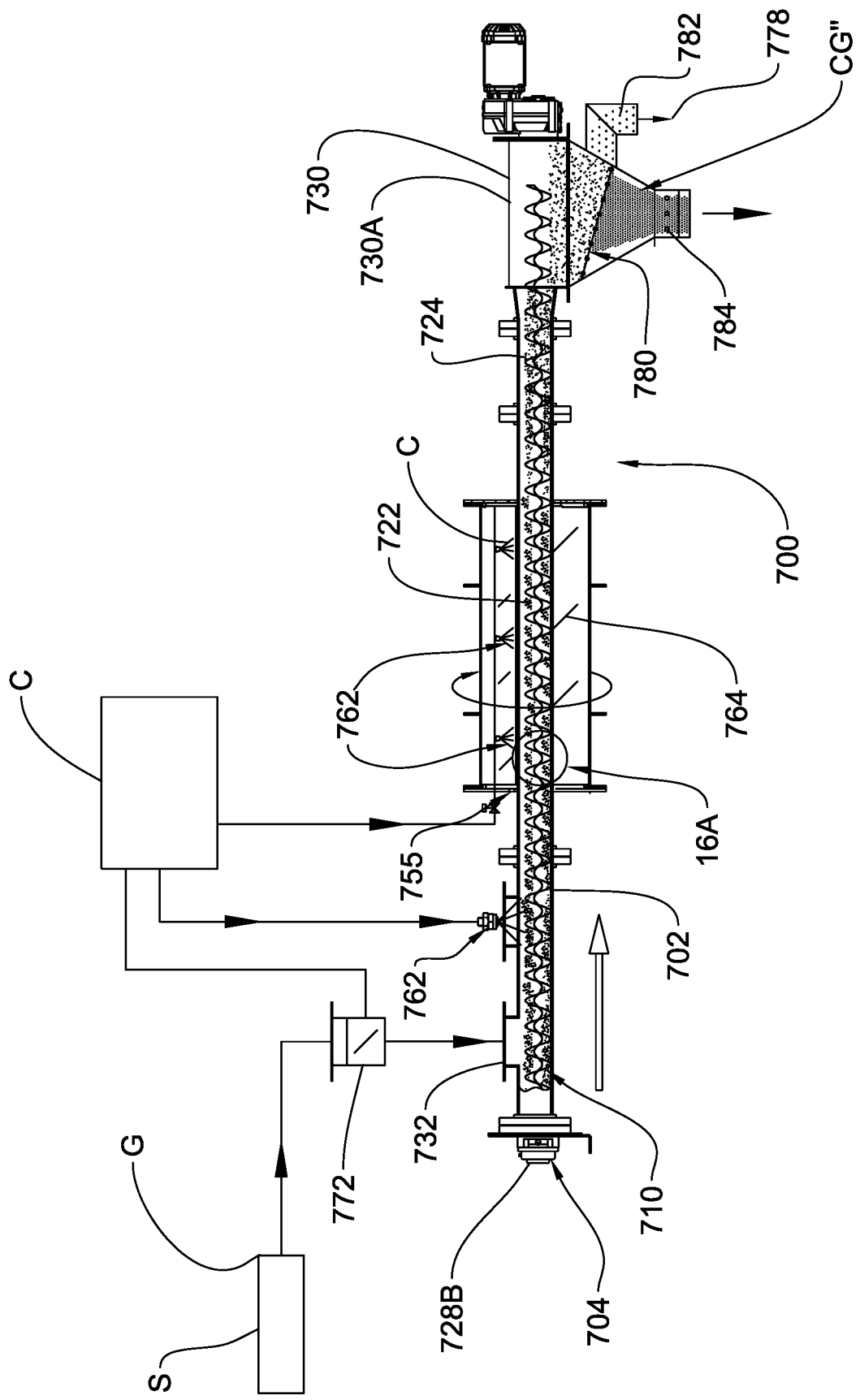
FIG. 16 is a partly sectional elevational view of a sixth embodiment of granular and powder flavoring conveyor system according to the invention, but with the shaft screw conveyor being replaced by a shaftless flexible screw conveyor.
Figure 16A:
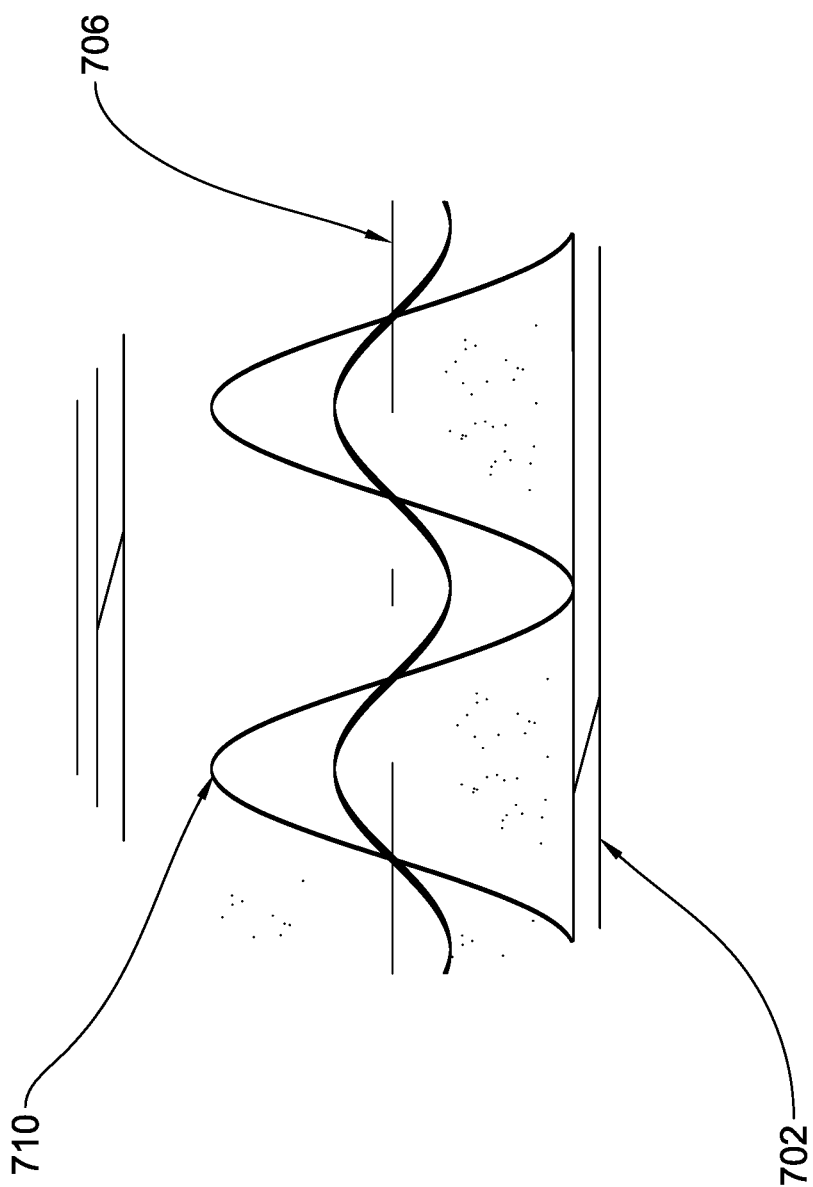
FIG. 16A is an enlarged view of the area circumscribed by circle 16A of FIG. 16.
Figure 17:
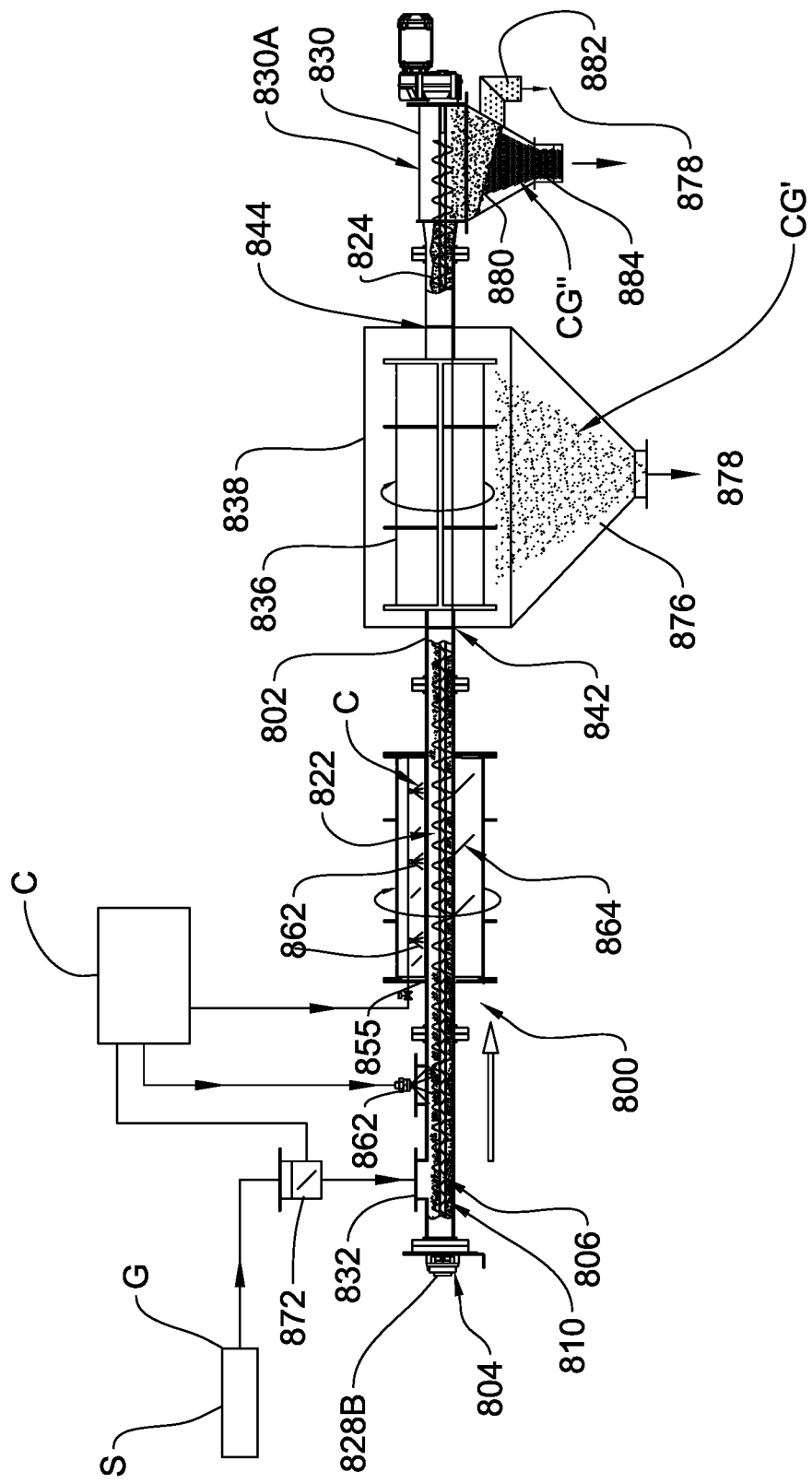
FIGS. 17 and 18 are views similar to that of the embodiments of FIGS. 15 and 16 respectively but for a seventh and eighth embodiments respectively of granular and powder flavoring conveyor system according to the invention, and further including an in-line secondary blender.
Figure 18:
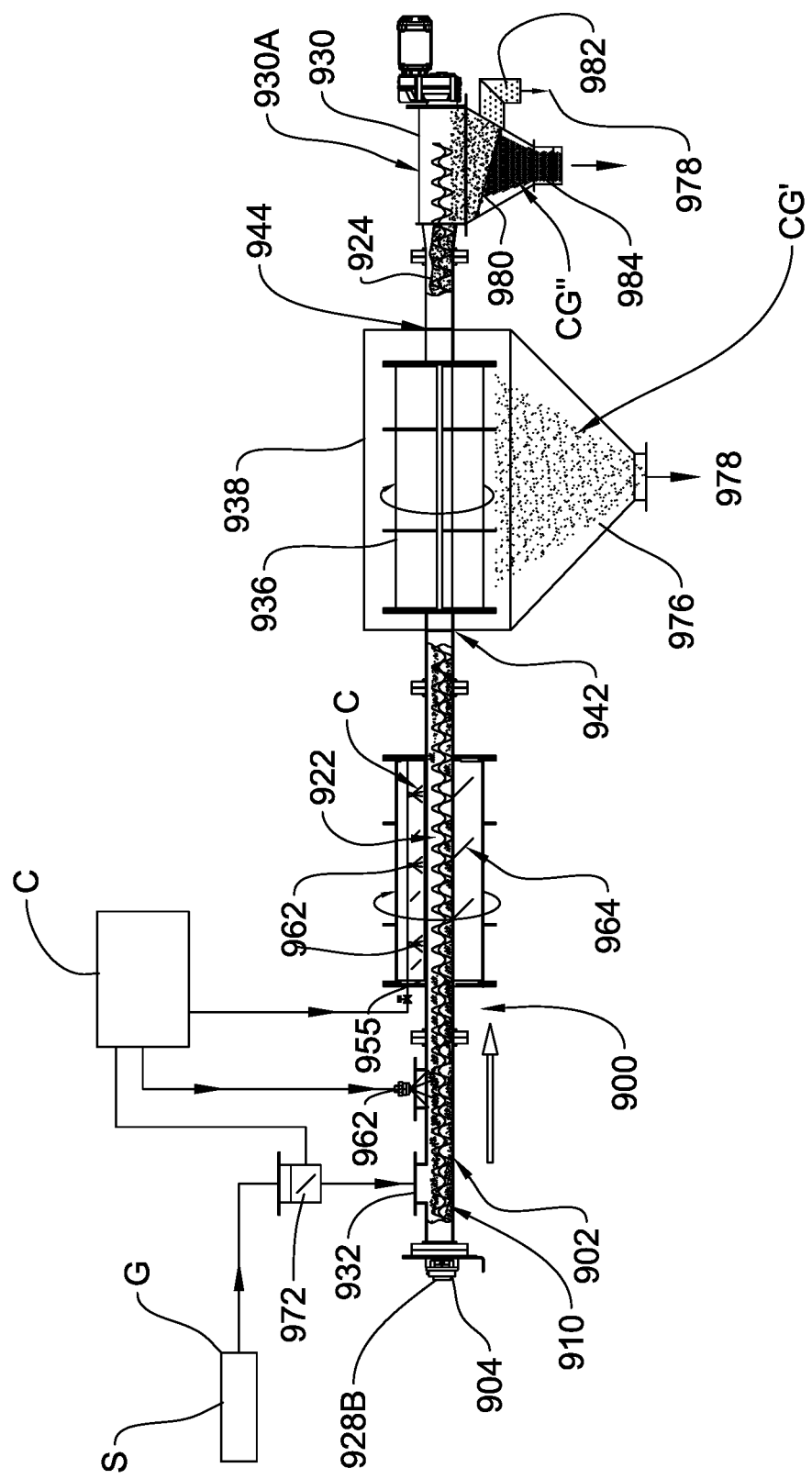
Figure 19:
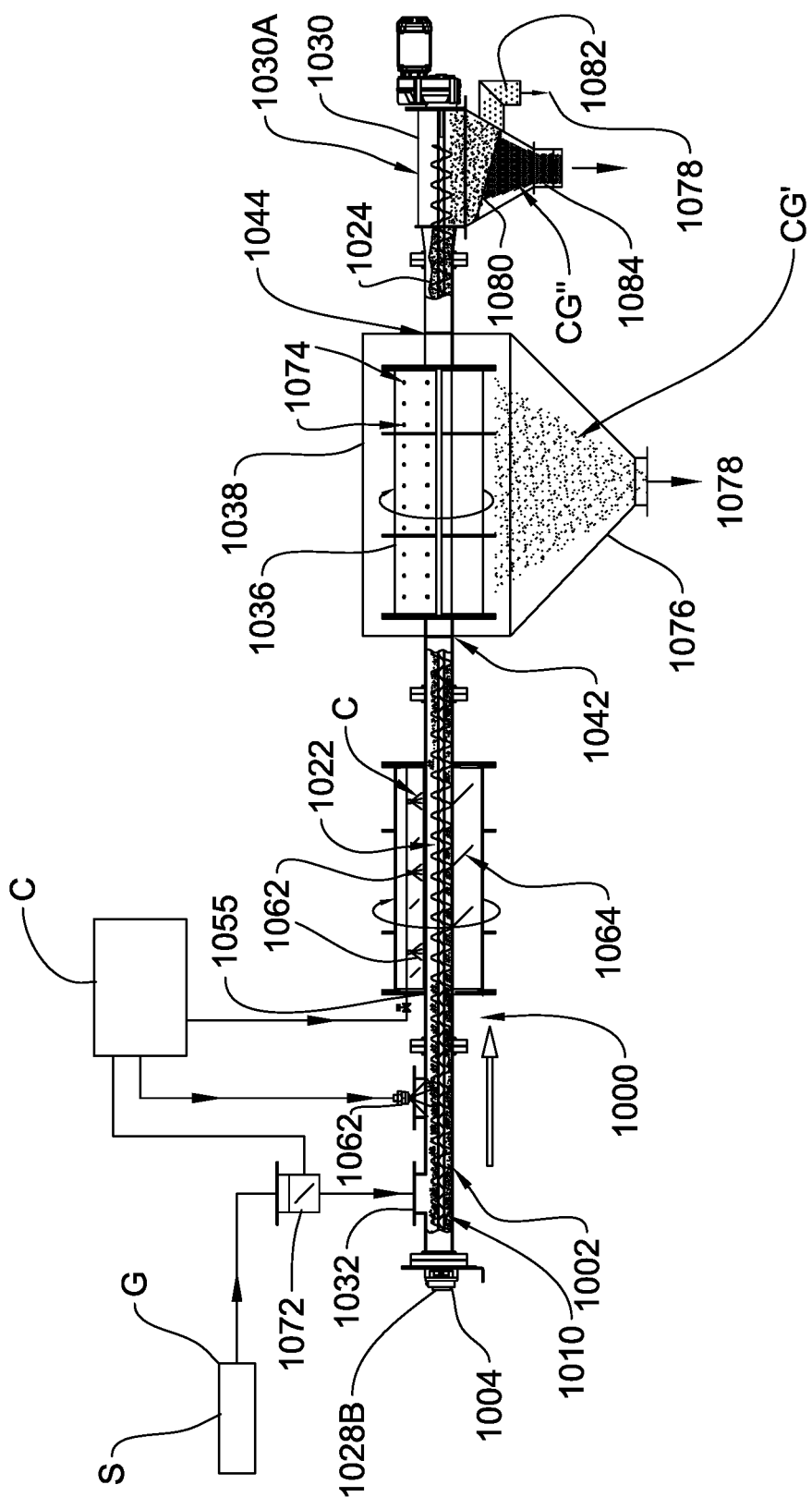
FIGS. 19 and 20 are views similar to that of the embodiments of FIGS. 17 and 18 respectively of granular and powder flavoring conveyor system according to the invention, and further incorporating a rotating screener within the in-line secondary blender.
Figure 20:
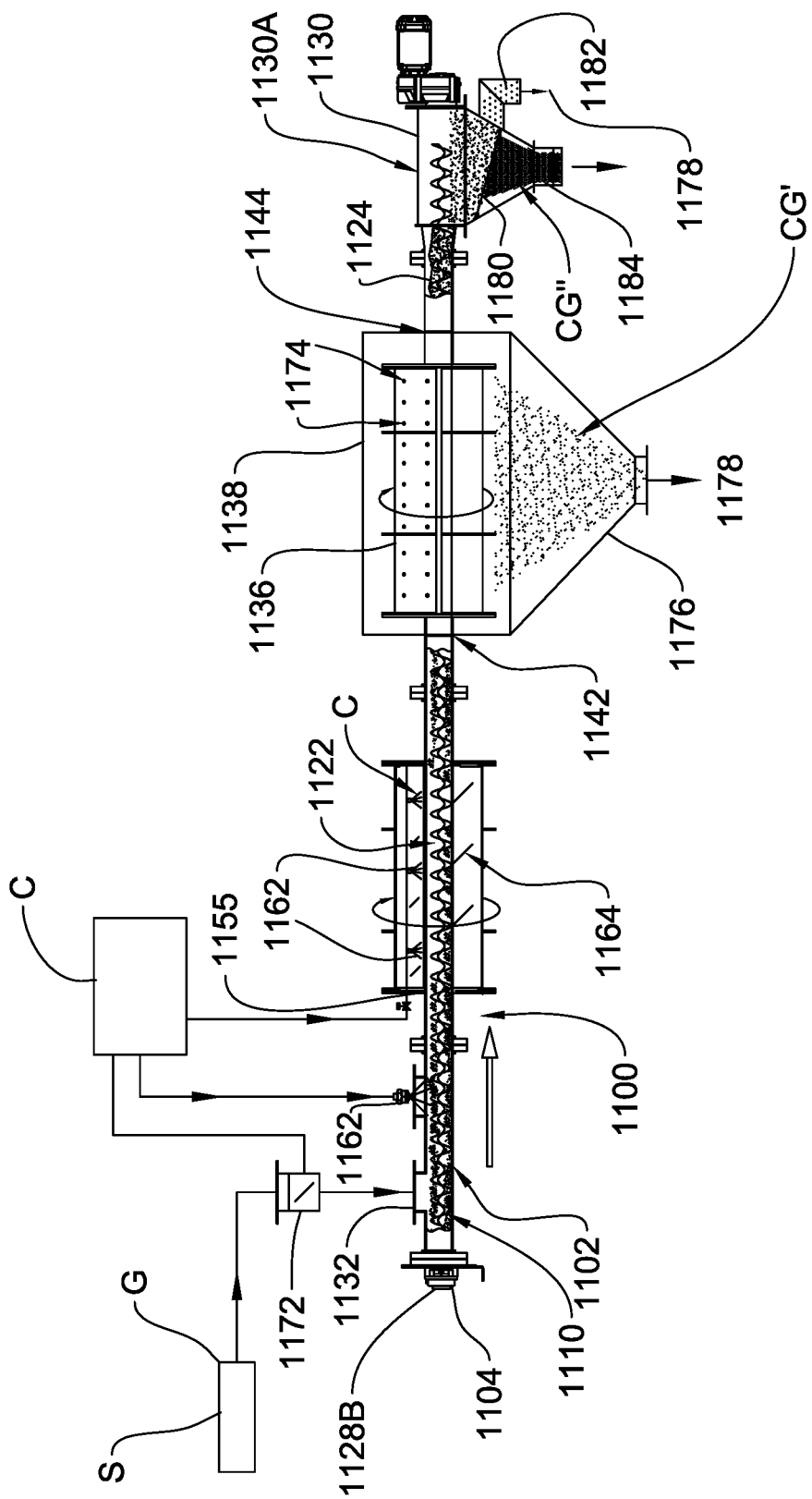

According to a further aspect of the invention best illustrated in FIGS. 1 and 11, an integral cleaning system 200 is provided to the present granular & powder material conveyor system. The purpose of cleaning system 200 is to allow easy transfer from one flavour compound to another flavour compound in the granular & powder particles spraying operation, with the least downtime period while ensuring no unwanted after-taste side effect from a previous flavour coating application. Cleaning system is provided adjacent the chain drive station 30. Clean In Place cleaning system 200 includes a dry ice ($CO_2$) source 201, lines 202, 204, 206 and 208 operatively connecting dry ice source 201 to chain tensioner station 28, blender station 36, screener station 38, and chain drive station 30 respectively, and a $CO_2$ outlet port 210 in the chain drive station 30. A suction fan 212 promotes $CO_2$ circulation through tubular members 24 and 26 via chain tensioner station 28 and chain drive station 30. Valves 214-220 control flow of dry ice from source 201 to chain tensioner station 28, blender station 36, screener station 38, and chain drive station 30.

to In the embodiments of FIGS. 2-5 and 12, an annular magnet 84, 384 is provided around the bottom mouth 176A, 376A, of conical hopper 176, 376 respectively, to retain metallic material contaminant that may accidentally be found in product feed source S so as to prevent release of this metallic material into said economic reclaim processing unit, in view of ensuring the highest safety standards of economically reclaimed food. In one embodiment, a valve 177 at bottom mouth 176A controls coated particles outflow.

According to a further aspect of the invention best illustrated in FIGS. 1 and 11, an integral cleaning system 200 is provided to the present granular & powder material conveyor system. The purpose of cleaning system 200 is to allow easy transfer from one flavour compound to another flavour compound in the granular & powder particles spraying operation, with the least downtime period while ensuring no unwanted after-taste side effect from a previous flavour coating application. Cleaning system is provided adjacent the drive station 30. Clean In Place cleaning system 200 includes a dry ice (CO2) source 201, lines 202, 204, 206 and 208 operatively connecting dry ice source 201 to stations 28, 36, 38 and 30 respectively, and a CO2 outlet port 210 in the chain drive housing 30. A suction fan 212 promotes CO2 circulation through tubes 24 and 26 via end stations 28 and 30. Valves 214-220 control flow of dry ice from source 201 to stations 28, 36, 38 and 30.

In the additional embodiments of FIGS. 12-14, corresponding elements from the first embodiment are identified under the 300, 400 and 500 series numerals, respectively. Tubular members 324 and 326 (424, 426; and 524, 526) are interconnected at one end by a tubular U-bend 327 (427, 527), respectively. In the embodiments of FIGS. 12-14, there is no continuous chain tensioning station.

FIG. 12 lacks both an in-line rotating screener and secondary cylinder. Oversized granular particle discharge elbowed outlet duct 382 projects transversely outwardly from hopper 376.

FIG. 13 has a combined secondary blender and rotating screener 438, while FIG. 14 has only a secondary blender 539. The other components remain substantially the same as in the conveyor system 21 of FIGS. 1-11.

In variants of the embodiment of FIG. 12, the tubular U-bend connector 327 would be modified to be:

a) flat; or b) a diverging U-bend with spread apart legs at any diverging angles relative to the conveying pipe through the mixer as reference axis.

In the further embodiments of FIGS. 15 to 20, corresponding elements from the conveyor system 21 are identified under 600 to 1100 series numerals, respectively. An endless screw conveyor 610, 710, 810, 910, 1010, 1110, extends through straight tubular member 602, 702, 802, 902, 1002, 1102, respectively. A bearing assembly 604, 704, 804, 904, 1004, 1104, is mounted at the end of tubular member 602, 702, 802, 902, 1002, 1102, opposite power screw drive station 630, 730, 830, 930, 1030, and 1130, respectively.

All embodiments 600 to 1100 comprise an in-line flavoring blender 636, 736, 836, 936, 1036 and 1136, respectively. The embodiments 800 and 900 further comprise an in-line secondary blender 839, 939, respectively; while the embodiments 1000 and 1100 comprise a combined in-line rotating screener and secondary blender 1038, 1138, respectively.

Embodiments 600, 800 and 1000 include an elongated axial shaft 606, 806, 1006 extending lengthwise through tubular members 602, 802, 1002, respectively and forming an integral part of screw conveyor 610, 810, 1010, respectively.

In all embodiments of the invention, the mixing drums (such as drum 40) from an integral element of the tubular chain conveyor, of the shaft screw conveyor, and of the flexible screw conveyor. The relative drum orientation could either be vertical, horizontal or obliquely angled.

In one embodiment, the percentage by weight of added flavour compound C coating onto the granular or powder particles G ranges between 0.1% and 5% of total weight of coated particles CG. Higher C/G ratios are not excluded from the scope of the present invention. The flavour compound could be artificial or natural, and could be in solid or fluid state. In one embodiment, the flavor compound is of liquid state. In one embodiment, granular or powder flow is measured by a mass flow meter and integrated with the flavouring pump for the proportional delivery of flavour, fragrance or fluid.

An "oversized" granular particle is defined as a granular particle size whose diameter exceeds a set first set threshold value beyond which the market will reject same; whereas an "undersized" granular particle is defined as a granular particle size whose diameter comes short of a second set threshold value below which the market will also reject same.

The granular particles to be coated may be selected from the group comprising:

non food compound particles;
chemical compound particles;
feed compound particles;
food particles;
ready-to-eat food particles;
dairy product particles;
meat and dairy particles;
all under strict sanitary conditions.

Granular or powder particles may be for example coffee beans, ground coffee powder, seeds, nuts, food, animal feed, kitty litter, including powder chemicals, calcium carbonate, titanium dioxide, pharmaceutical products, and the like. In one embodiment of the present invention, the granular particles are selected from the group comprising: canola, cashew nuts, peanuts, peas, vegetables wet or dry. The corresponding coating compound is selected in one embodiment from the group comprising: a polymeric compound, salt, icing, preservatives and chemicals, including fragrance, dyes, and colourings.

The present in-line flavoring granular and powder conveyor system includes a self-contained conveyor system which can be periodically cleaned by Clean-In-Place (CIP) cleaning operation to remove remaining flavoring compound traces. CIP cleaning operations are not limited to dry ice feed, but could alternately use any other suitable liquid, gas or fluid feed, for example suitable water solution, caustic fluid, or sanitizer fluid.

The invention claimed is:

1. A granular coating conveyor system for coating granular particles along a conveyor member, the conveyor system defining a tubular member through which is axially movable the conveyor member, a drive means powering the conveyor member, the conveyor member defining a plurality of successive compartments for each receiving a plurality of the granular particles, coating fluid feed means feeding a coating fluid onto the granular particles through coating fluid spray means, a blender member coaxially mounted to the tubular member with a tubular member upstream granular particles discharge port from the compartments and a tubular member downstream granular particles return ingress port into the compartments for through passage of coated the granular particles, a rotating means rotating the blender member axially of the tubular member, and a coated granular particles outlet means located on the tubular member downstream of the blender member;

wherein the blender member consists of an open drum, the coating fluid spray means including at least one stationary radial nozzle member inside the drum, the tubular member upstream discharge port located at an upstream interior portion of the drum for granular particles escape from the compartments into the drum, a mixing and conveying means integral to the drum and axially engaging and moving the granular particles having escaped inside the drum through the upstream discharge port and mixing in tumbling fashion the granular particles with the coating fluid with such a granular particles load that a kidney shape mass of granular particles is dynamically formed, the tubular member downstream return ingress port located at a downstream interior portion of the drum for coated granular particles return ingress from the drum into the tubular member.

2. The granular coating conveyor system as in claim 1, wherein the mixing and conveying means consists of a helicoidal spiral screw member integrally mounted to an interior peripheral wall face of the drum and extending therealong radially outwardly of the tubular member and mixing and guiding therealong the granular particles.

3. The granular coating conveyor system as in claim 2, wherein the spiral screw member is cross-sectionally polygonal.

4. The granular coating conveyor system as in claim 3, wherein the spiral screw member is quadrangular in cross-section.

5. The granular coating conveyor system as in claim 1, wherein the conveyor member is a shaft screw conveyor.

6. The granular coating conveyor system as in claim 1, wherein the conveyor member is a shaftless flexible screw conveyor.

7. The granular coating conveyor system as in claim 1, further including a secondary granular particles coating blender defining a secondary drum rotatably mounted to the tubular member and located intermediate the coated granular particles outlet means and the first mentioned blender member, the coating fluid spray means further including at least another stationary radial nozzle member inside the secondary drum.

8. The granular coating conveyor system as in claim 7, wherein the conveyor member is a shaft screw conveyor.

9. The granular coating conveyor system as in claim 7, wherein the conveyor member is a shaftless flexible screw conveyor.

10. The granular coating conveyor system as in claim 7, further including a cylindroid screener, carried radially outwardly of the drum and rotating therewith and having a number of peripheral slits for centrifugal escape of undersized granular particles.

11. The granular coating conveyor system as in claim 10, wherein the conveyor member is a shaft screw conveyor.

12. The granular coating conveyor system as in claim 10, wherein the conveyor member is a shaftless flexible screw conveyor.

13. The granular coating conveyor system as in claim 5, wherein the shaft screw conveyor is of the endless type, and further including a continuous chain tensioner at one elbowed end portion of the shaft screw endless conveyor.

14. The granular coating conveyor system as in claim 1, wherein the coating fluid is selected from the group comprising liquid flavour and fragrance.

15. The granular coating conveyor system as in claim 1, wherein the tubular member downstream ingress port for the coated granular particles includes segregated oversized first granular particles outlet and non-oversized second granular particles outlet.

16. The granular coating conveyor system as in claim 1, further including dry ice clean-in-place feed means, feeding dry ice inside the tubular member between two granular particle coating operations, to remove coating fluid traces remaining from a first granular particles coating operation before starting a second granular particles coating operation.

17. The granular coating conveyor system as in claim 1, further including a magnetic member mounted integral to the coated granular particles outlet means, for screening metallic contaminants apart from coated granular particles.

18. A blender for use in a granular coating conveyor system, the latter of the type for coating granular particles along a conveyor member, the conveyor system defining an endless tubular member through which is axially movable the conveyor member, a drive means powering the conveyor member, the conveyor member defining a plurality of successive compartments each receiving a plurality of the granular particles, a coating fluid feed means feeding a coating fluid onto the granular particles through coating fluid spray means, a blender member coaxially mounted to the conveyor member with the tubular member upstream discharge port and the tubular member downstream ingress port for through passage of coated the granular particles, a rotating means rotating the blender member axially of the tubular member, and a coated granular particles outlet means located on the tubular member downstream of the blender member;

the blender consisting of an open drum, a mixing and conveying means integral to the drum and for axially engaging and moving the granular particles having escaped inside the drum through the upstream discharge port and mixing in tumbling fashion the granular particles with the coating fluid, with such a granular particles load that a kidney shape mass of granular particles is formed.

19. The blender as in claim 18, wherein the mixing and conveying means consists of a helicoidal spiral screw member integrally mounted to an interior peripheral wall face of the drum and extending therealong radially outwardly of the tubular member, for mixing and guiding therealong the granular particles.

20. The blender as in claim 19, wherein the spiral screw member being cross-sectionally quadrangular.

* * * * *